United States Patent
Yamasaki et al.

(10) Patent No.: US 6,989,939 B2
(45) Date of Patent: Jan. 24, 2006

(54) VARIABLE-POWER OPTICAL SYSTEM, PROJECTION OPTICAL SYSTEM, AND IMAGE PROJECTION APPARATUS USING THE SYSTEMS

(75) Inventors: Shinji Yamasaki, Tochigi (JP); Hiroki Nakayama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 10/916,142

(22) Filed: Aug. 11, 2004

(65) Prior Publication Data

US 2005/0036207 A1     Feb. 17, 2005

(30) Foreign Application Priority Data

Aug. 11, 2003 (JP) .............................. 2003-207160
Sep. 29, 2003 (JP) .............................. 2003-337564

(51) Int. Cl.
   *G02B 15/14*     (2006.01)
(52) U.S. Cl. ..................... 359/676; 359/761; 359/680; 359/682; 359/683; 359/752
(58) Field of Classification Search ................ 359/676, 359/680–683, 752, 761
   See application file for complete search history.

(56) References Cited

U.S. PATENT DOCUMENTS

| 6,081,389 | A | | 6/2000 | Takayama et al. | |
|---|---|---|---|---|---|
| 6,147,812 | A | * | 11/2000 | Narimatsu et al. | .......... 359/691 |
| 6,285,509 | B1 | | 9/2001 | Nakayama et al. | |
| 6,888,683 | B2 | * | 5/2005 | Itoh | ............................ 359/686 |
| 2003/0169509 | A1 | * | 9/2003 | Iyama | ......................... 359/680 |
| 2003/0210471 | A1 | * | 11/2003 | Mihara et al. | .............. 359/691 |
| 2003/0234984 | A1 | * | 12/2003 | Nagahara | .................... 359/680 |
| 2005/0002115 | A1 | * | 1/2005 | Mihara | ........................ 359/686 |

FOREIGN PATENT DOCUMENTS

| JP | 11-190821 | 7/1999 |
|---|---|---|
| JP | 2000-19400 | 1/2000 |
| JP | 2001-108900 | 4/2001 |
| JP | 2001-215410 | 8/2001 |

\* cited by examiner

*Primary Examiner*—Evelyn A. Lester
(74) *Attorney, Agent, or Firm*—Morgan & Finnegan, LLP

(57) ABSTRACT

Disclosed is a variable-power optical system, including, sequentially from a front side to a rear side, a negative-refractive-power first lens unit that does not move for zooming, a positive-refractive-power second lens unit, a negative-refractive-power third lens unit, a fourth lens unit, a negative-refractive-power fifth lens unit, and a positive-refractive-power sixth lens unit that does not move for zooming, in which the following conditional expression is satisfied:

$$1.7 < bf/(|f1| \cdot fw)^{1/2} < 2.3$$

where f1 represents a focal length of the first lens unit, bf represents a back focus in air, and fw represents a focal length of an overall system at a wide angle end, whereby, while downsizing of an overall lens system is achieved, various aberrations accompanying zooming are well corrected, good optical performance is attained over an entire screen, and a wide angle of view and a long back focus are also attained.

13 Claims, 22 Drawing Sheets

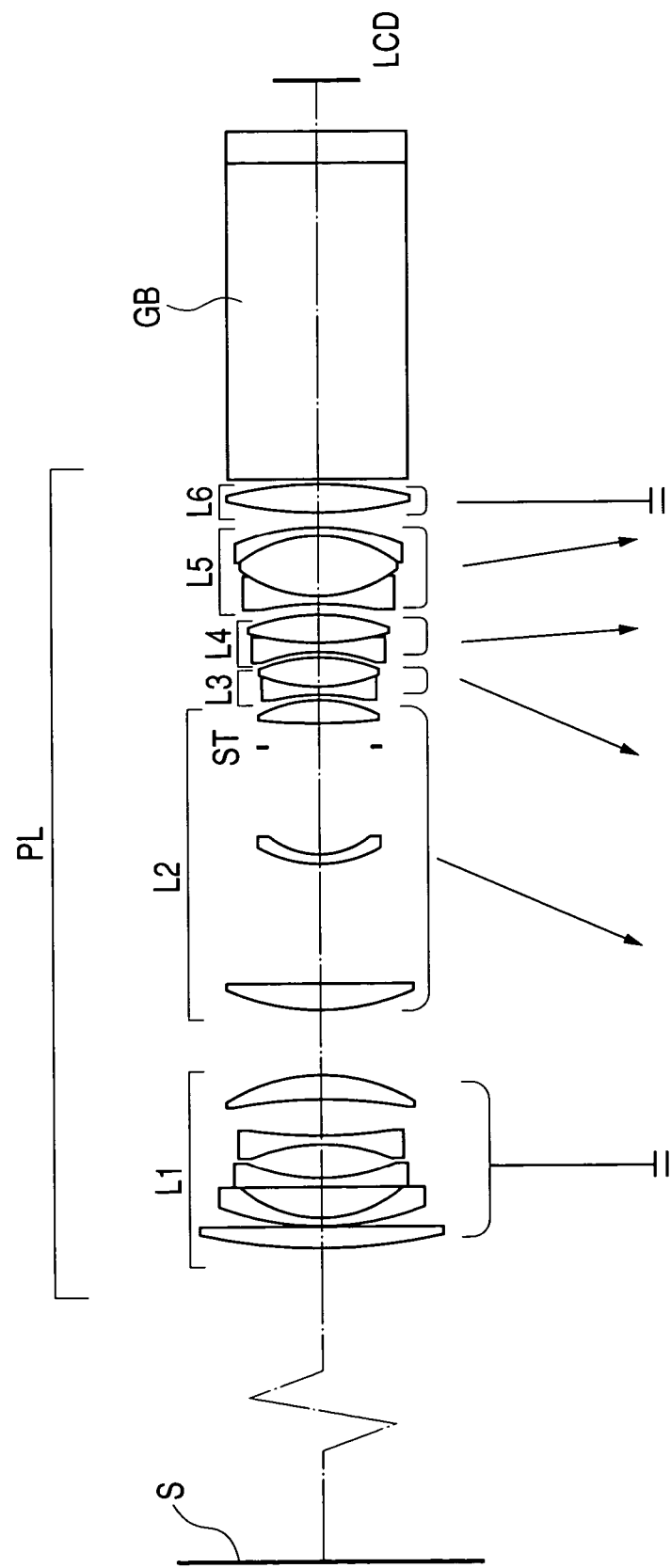

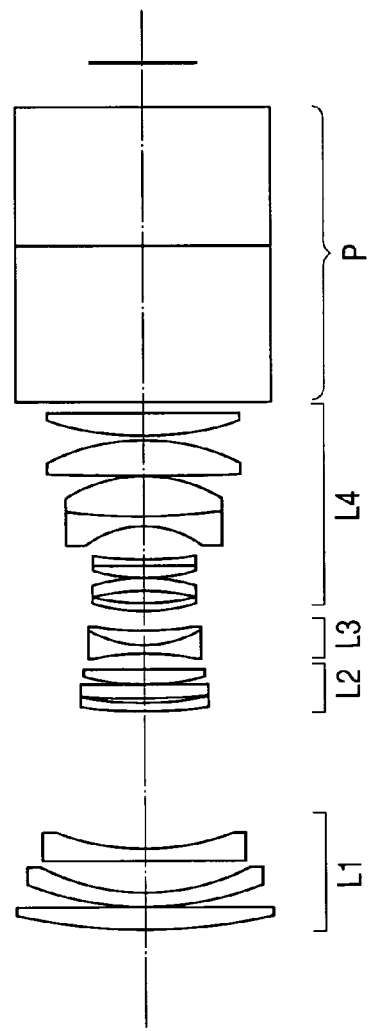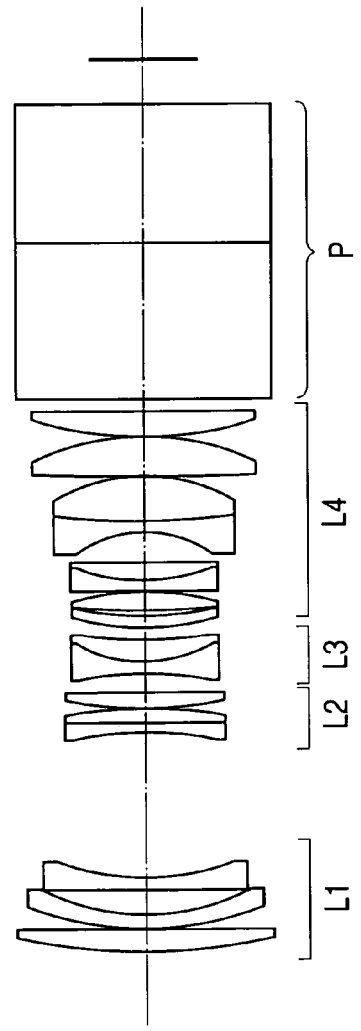

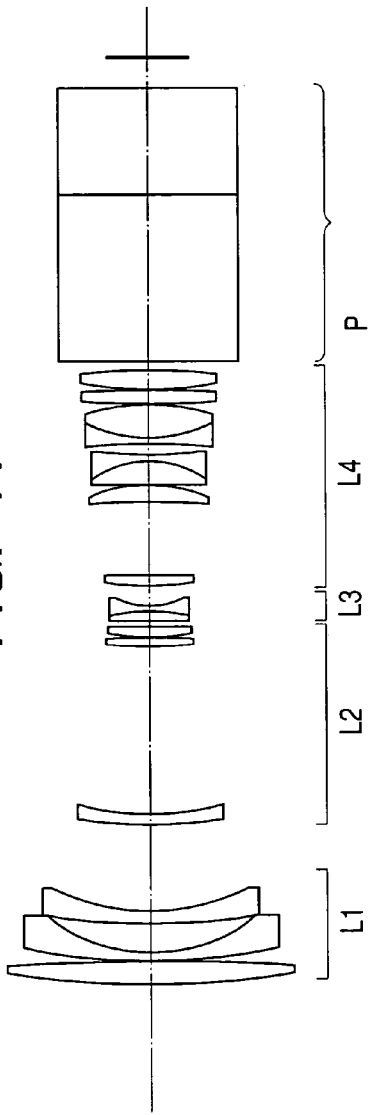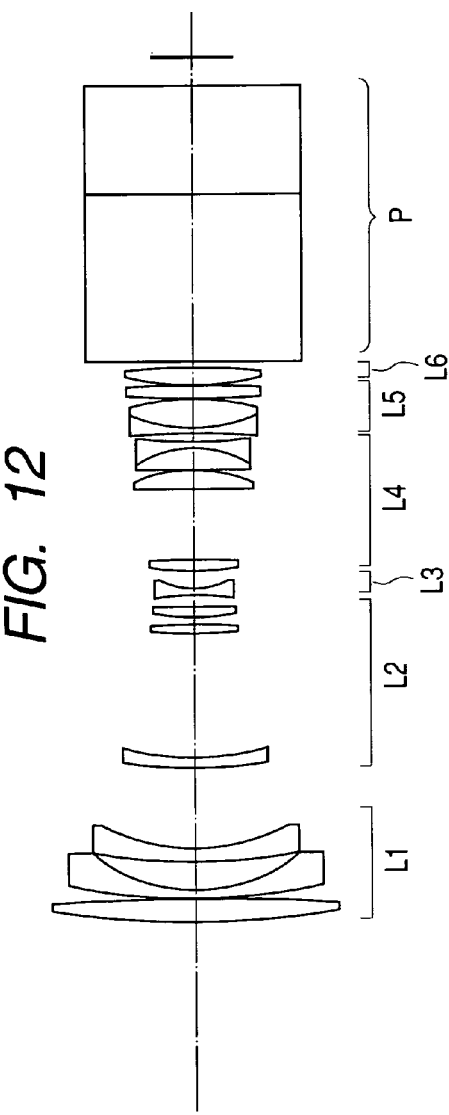

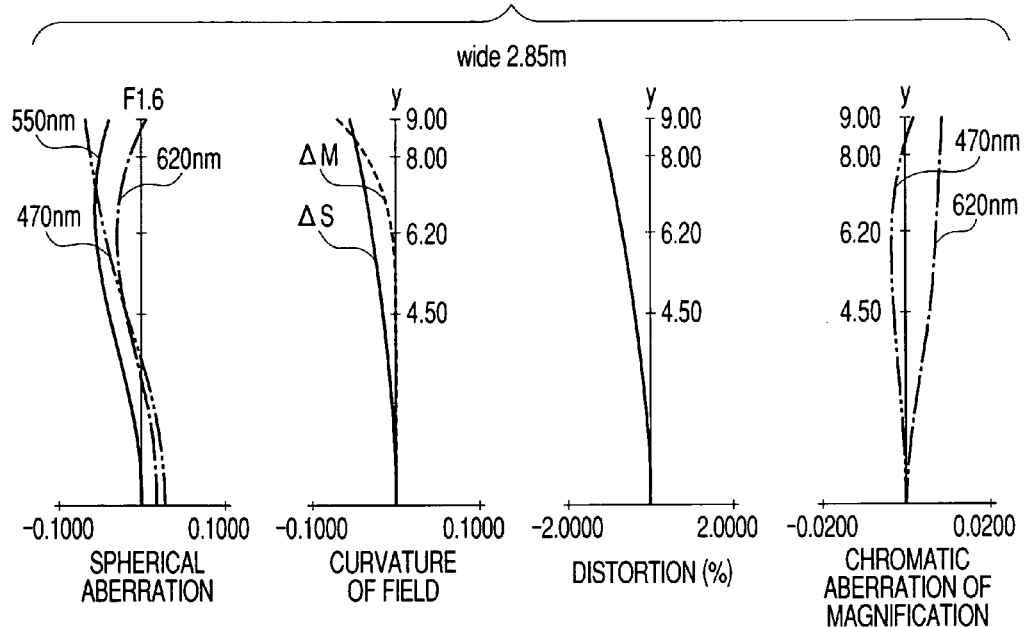
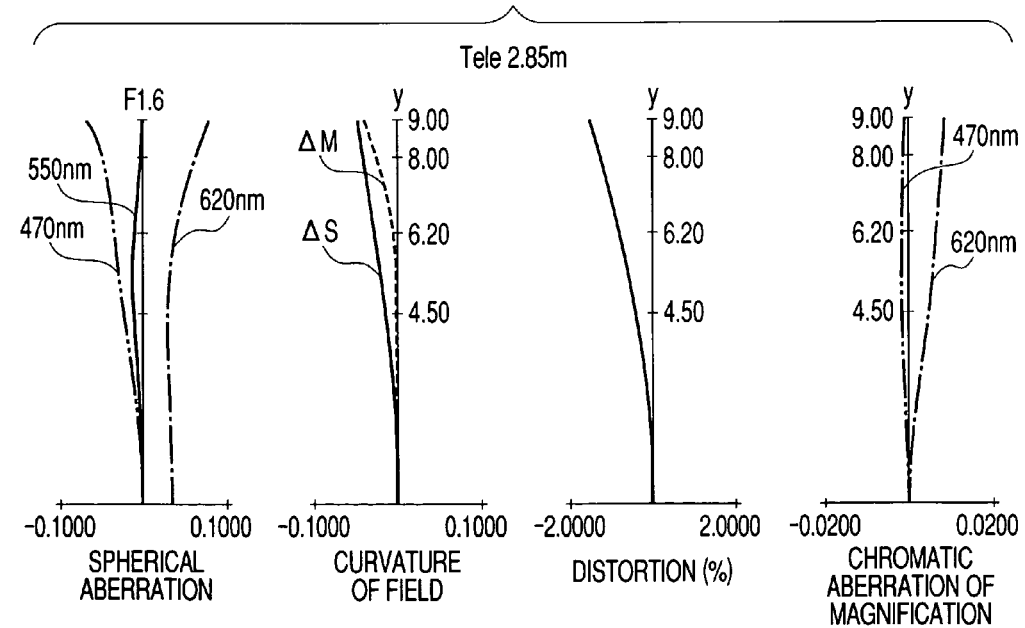

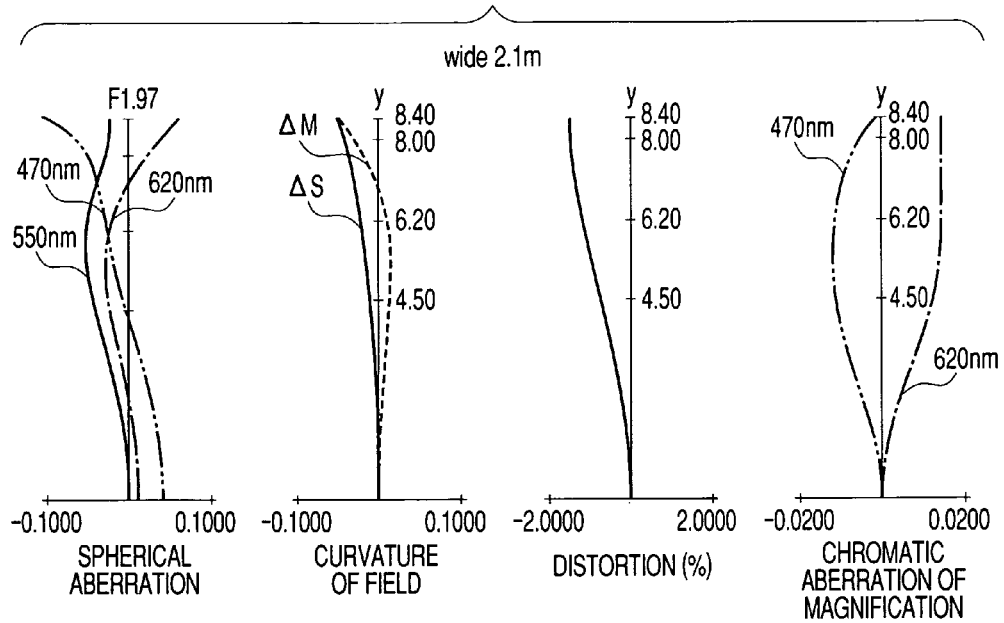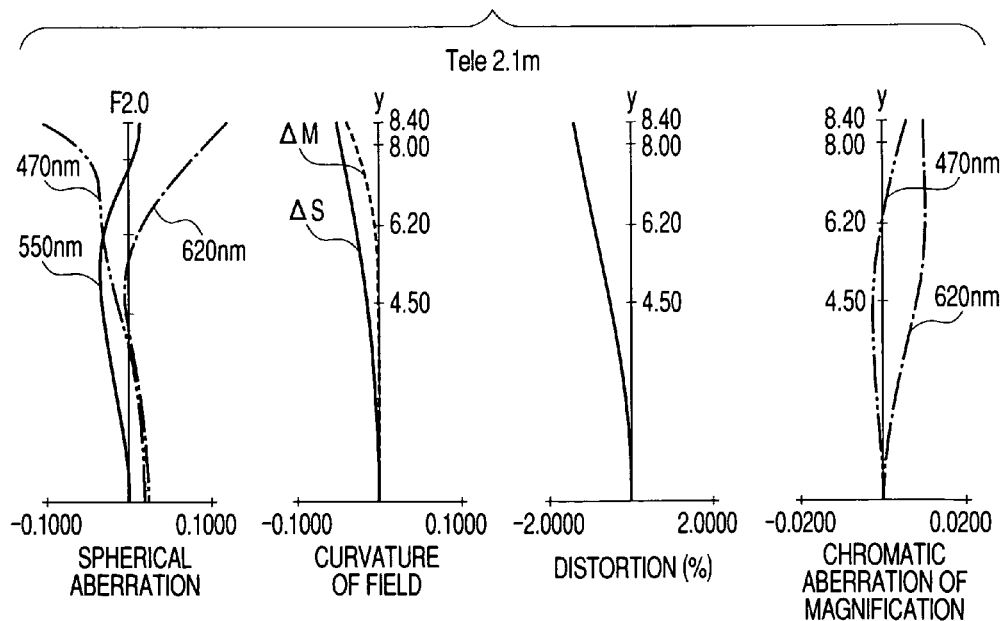

VARIABLE-POWER OPTICAL SYSTEM, PROJECTION OPTICAL SYSTEM, AND IMAGE PROJECTION APPARATUS USING THE SYSTEMS

BACKGROUND OF THE INVENTION

1. Field of the Invention

The present invention relates to a variable-power optical system or a projection optical system, and the present invention is suitably applied to, for example, a projection optical system of an image projection apparatus which enlarges an original image and projects the enlarged original image on a screen (projection surface).

2. Related Background Art

Heretofore, a variety of liquid crystal projectors (image projection apparatuses), each of which uses an image display element such as a liquid crystal display element and projects an image (original image) displayed on the image display element on a screen surface (projection surface), have been proposed.

In particular, as an apparatus capable of projecting an image of a personal computer and the like on a large screen, such a liquid crystal projector has been widely utilized in a conference, a presentation, and the like. Moreover, recently, a downsized liquid crystal projector for a home theater system has been widespread, and along with this, a size of the liquid crystal display element tends to be also downsized.

The liquid crystal projector as described above is roughly classified into two types. One of the types is a transmission liquid crystal projector which synthesizes colors of a modulated image transmitted through the liquid crystal display element and projects the color-synthesized image. The other type is a reflection liquid crystal projector which has a mirror installed on a back side of the liquid crystal display element, reflects a modulated image on the mirror, and projects the reflected modulated image.

In a liquid crystal projector of a three-plate system, which uses three liquid crystal display elements, a space in which a dichroic prism, a polarizing plate, and the like which synthesize color light modulated by the liquid crystal display elements are to be arranged must be secured between the liquid crystal display elements and a projection lens, and it becomes necessary to ensure a back focus with a certain length for the projection lens.

In such a liquid crystal projector, a negative lead type zoom lens in which a lens unit having negative refractive power is arranged in the front has been widely utilized. The negative lead type zoom lens has features that widening of a view angle thereof is relatively easy, it is possible to well maintain optical performance in a distance of close-up shooting, and so on. On the contrary, a movement of the lens unit moving at zooming is increased, and aberration variations are also increased along therewith. Moreover, the negative lead type zoom lens has drawbacks that it is difficult to impart a higher zoom ratio thereto, it is difficult to widen the angle while restricting various aberrations, and so on.

Moreover, what is required for a projection optical system for use in a color liquid crystal projector is as follows:

The projection optical system should be a so-called telecentric optical system in which a pupil on the liquid crystal display elements (reduction) side is present at an infinite distance for the purpose of minimizing an influence of a dependency on an angle of a color synthesis film provided on the dichroic prism and ensuring good pupil alignment with an illumination system;

Respective images on pixels of three colors must be superposed together on an entire screen so as to prevent a situation where a resolution and quality of a picture (image) on liquid crystal display elements of the respective colors are impaired, for example, letters and the like on a personal computer display look double when the picture (image) is synthesized and projected on the screen. To that end, a color misregistration (chromatic aberration of magnification) occurring on a projection lens should be corrected well in the visible light range;

For the projected image, a distortion should be sufficiently corrected lest the projected image should be distorted at an outline thereof and look unsightly (particularly, when abrupt changes of the distortion in a periphery, intermediate portion and the like thereof remain to be eliminated, image quality is undesirably lowered); and the like.

Moreover, recently, for a small-size panel-equipped projector, downsizing and weight reduction thereof have been strongly required placing a premium on mobility while there have arisen needs such as higher brightness of the screen and higher definition of the image. Furthermore, specifications of higher brightness and a wider angle of view, which enable projection onto a bright and large screen in a narrow room, have also been required.

Heretofore, as such a projection lens for the liquid crystal projector, there has been known a six-unit zoom lens composed of six lens units as a whole, which have negative, positive, positive, negative, positive, and positive refractive powers sequentially from an enlargement side (front side), and by properly moving predetermined lens units thereamong, zooming is performed (for example, see Japanese Patent Application Laid-Open No. 2001-108900). This six-unit zoom lens sets first, fourth, and sixth lens units to be fixed, and moves second, third, and fifth lens units inside the lens system at the time of zooming from a wide angle end to a telescope end. Accordingly, the six-unit zoom lens is a telecentric zoom lens, in which an overall length of the lens units is kept constant even at the time of zooming, and the aberration variations at the time of chromatic aberration and zooming are restricted. However, in this six-unit zoom lens, a back focus length is insufficient for use in the reflection liquid crystal projector.

Besides the above, as a projection lens for the liquid crystal projector, there has been known a four-unit zoom lens composed of four lens units as a whole, which have negative, positive, negative, and positive refractive powers from an enlargement side, and by properly moving predetermined lens units thereamong, zooming is performed (for example, see Japanese Patent Application Laid-Open No. 2001-215410). This four-unit zoom lens sets first and fourth lens units to be fixed, and moves second and third lens units inside the lens system at the time of zooming from a wide angle end to a telescope end. Accordingly, the four-unit zoom lens is a telecentric zoom lens, in which an overall length of the lens units is kept constant, and a sufficiently long back focus and a relatively wide angle of view in consideration of the application to the reflection liquid crystal projector are provided. However, this four-unit zoom lens has a relatively large F-number for full aperture (hereinafter, the F-number represents it for full aperture), and does not obtain sufficient brightness.

Moreover, Japanese Patent Application Laid-Open No. H11-190821 (counterpart: U.S. Pat. No. 6,285,509) and Japanese Patent Application Laid-Open No. 2000-019400 (counterpart: U.S. Pat. No. 6,081,389) have been known to disclose a projection lens for a projector using transmission liquid crystal display elements.

At present, as a liquid crystal projector, a small-size and mobile one is desired. Moreover, a capability of short-distance projection, which becomes a great merit as one for the home theater system, that is, the widening of the angle of view of the liquid crystal projector is required. Furthermore, in recent years, for the purpose of higher brightness of a projected video image, reflection liquid crystal display elements having good aperture efficiency have been utilized frequently.

As a solution to a problem of how to downsize of the liquid crystal projector, first, the liquid crystal display elements must be small. However, when the same resolution is to be obtained by use of the small liquid crystal display elements, an aperture ratio of the liquid crystal display elements is lowered, and a size ratio of a region to be illuminated to a light emitting source (=size of the region to be illuminated/size of the light source) becomes gradually small. Accordingly, illumination efficiency is lowered in general, causing a problem that the brightness falls even if the downsizing of the liquid crystal projector can be realized.

In the case of the transmission liquid crystal display elements, as a dimension of the liquid crystal display elements becomes smaller, the aperture ratio is lowered due to a drive circuit thereof, and a light quantity is reduced. On the contrary, in the case of the reflection liquid crystal display elements, the drive circuit can be installed on a back side of a panel, and accordingly, the aperture ratio is increased, and the reduction in light quantity can be restricted. For this reason, recently, a bright zoom lens for the reflection liquid crystal projector, which has high aperture efficiency, is desired in order to obtain the higher brightness in an efficient manner. However, in the reflection liquid crystal projector, required is a projection lens having a longer back focus than that of the transmission liquid crystal projector in order to insert a polarization splitter optical system and the like between the projection lens and the liquid crystal display elements in addition to the color synthesis optical system such as the dichroic prism.

In addition to the above-described problem, a projection lens with brightness in which an F number at a wide angle end is approximately 3.0 or more is desired for the projection lens for the small-size projector in order to ensure a screen illuminance sufficient for an observation under an illumination of a fluorescent lamp.

Moreover, it is not preferable that a pupil position on the original image side vary by zooming and focusing. It is necessary that an aperture stop be fixed for the liquid crystal display elements or that variations of the pupil position be minimized by moving the plural lens units.

Specifically, for the small-size and lightweight reflection liquid crystal projector, a projection lens is desired, which has high brightness/resolution and small variations of the pupil position, and is capable of the short-distance projection with the sufficiently long back focus.

SUMMARY OF THE INVENTION

It is an object of the present invention to provide a variable-power optical system or a projection optical system suitable for a projection lens, for example, of a liquid crystal projector, which has a long back focus, while achieving downsizing of an overall lens system.

A variable-power optical system according to an illustrative aspect of the present invention includes a negative-refractive-power first lens unit which does not move for zooming, a positive-refractive-power second lens unit, a negative-refractive-power third lens unit, a negative or positive-refractive-power fourth lens unit, a negative-refractive-power fifth lens unit, and a positive-refractive-power sixth lens unit which does not move for zooming, sequentially from a front side (screen side in a case of a projection apparatus, subject side in a case of an image taking apparatus) to a rear side (original image side in the case of the projection apparatus, image side in the case of the image taking apparatus), in which the following conditional expression is satisfied:

$$1.7 < bf/(|f1| \cdot fw)^{1/2} < 2.3$$

where f1 represents a focal length of the first lens unit, bf represents a back focus in air, and fw represents a focal length of an overall system at a short focal-length end (so-called wide angle end).

Moreover, a projection optical system according to another illustrative aspect of the present invention includes a plurality of lens units in which intervals therebetween are changed during zooming, the system enlarging an original image and projecting the enlarged original image on a projection surface, in which a back focus in air (distance in air conversion between a reduction-side conjugate position (original image position) on a side where a conjugate length is short and a lens element closest to the reduction-side conjugate position) is 2.5 times or more a diameter of an effective image circle on the original image portion (reduction-side conjugate position), and the following expression is satisfied:

$$|\phi/tk| < 0.12 \qquad (1)$$

where $\phi$ represents the diameter of the effective image circle, and tk represents a distance at a short focal-length end from the original image to a paraxial pupil position viewed from the original image side.

BRIEF DESCRIPTION OF THE DRAWINGS

FIG. 1 is a schematic view of main portions of an image projection apparatus using a variable-power optical system of Numerical Embodiment 1;

FIG. 7 is a schematic view of main portions of an image projection apparatus using a projection optical system of Numerical Embodiment 4;

FIG. 8 is a schematic view of main portions of an image projection apparatus using a projection optical system of Numerical Embodiment 5;

FIG. 11 is a schematic view of main portions of an image projection apparatus using a projection optical system of Numerical Embodiment 8;

FIG. 12 is a schematic view of main portions of an image projection apparatus using a projection optical system of Numerical Embodiment 9;

FIGS. 19A and 19B are aberration graphs of the projection optical system of Numerical Embodiment 6;

FIGS. 23A and 23B are aberration graphs of the projection optical system of Numerical Embodiment 10;

DESCRIPTION OF THE PREFERRED EMBODIMENTS (First Embodiment)

An embodiment of a variable-power optical system (zoom lens system) of the present invention will be described below with reference to the accompanying drawings.

Figure 2A:
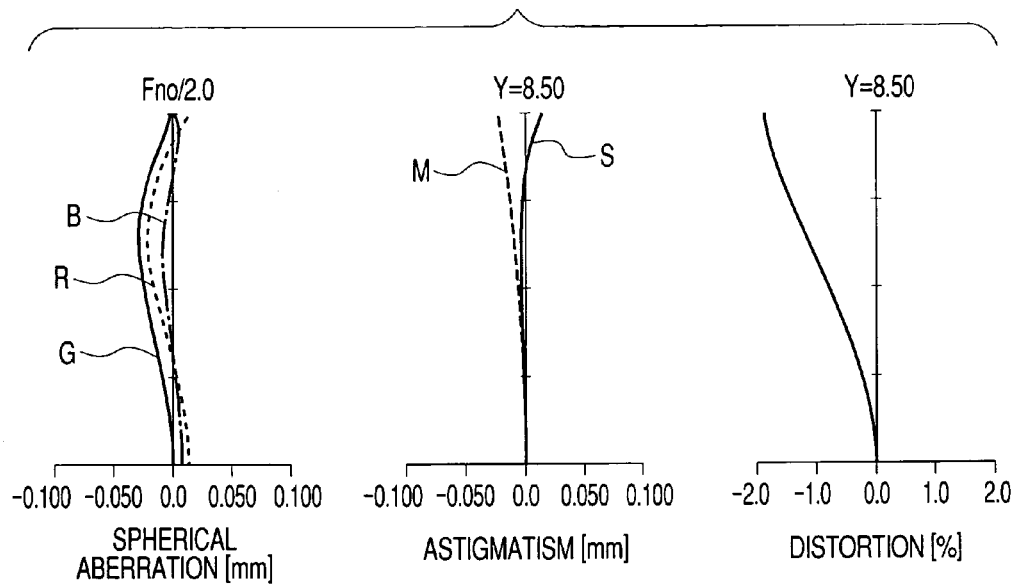
FIGS. 2A and 2B are aberration graphs of the variable-power optical system of Numerical Embodiment 1.
Figure 2B:
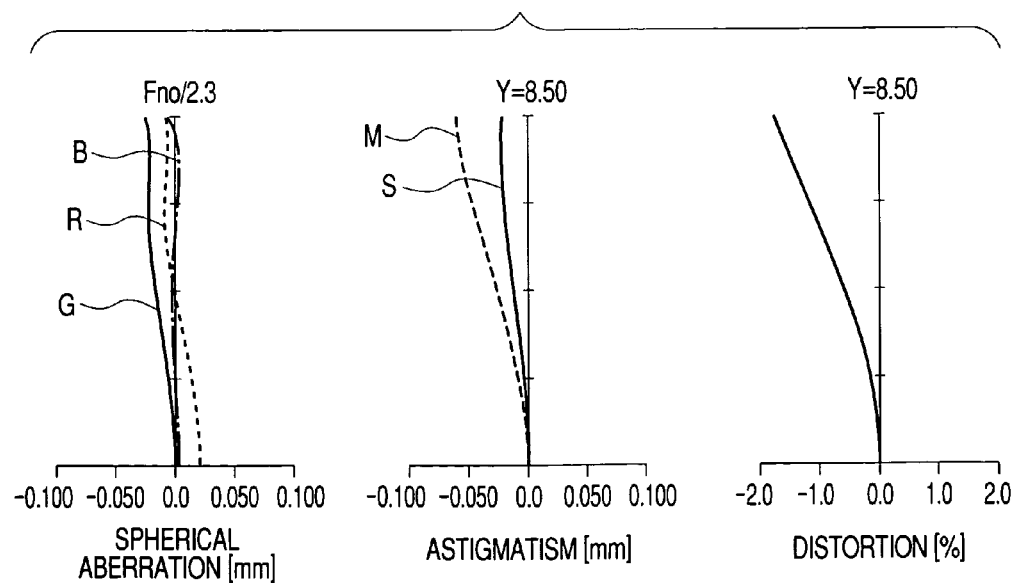

FIG. 1 is a schematic view of main portions of an image projection apparatus (liquid crystal video projector) using a zoom lens according to Embodiment 1 of the present invention. FIGS. 2A and 2B are aberration graphs at a wide angle end (short focal-length end) and a telescope end (long focal-length end) at an object distance (distance from a first lens unit to a screen) of 1.8 m when numeric values of Numerical Embodiment 1 described later, which corresponds to Embodiment 1 of the present invention, are expressed in millimeters.

Figure 3:
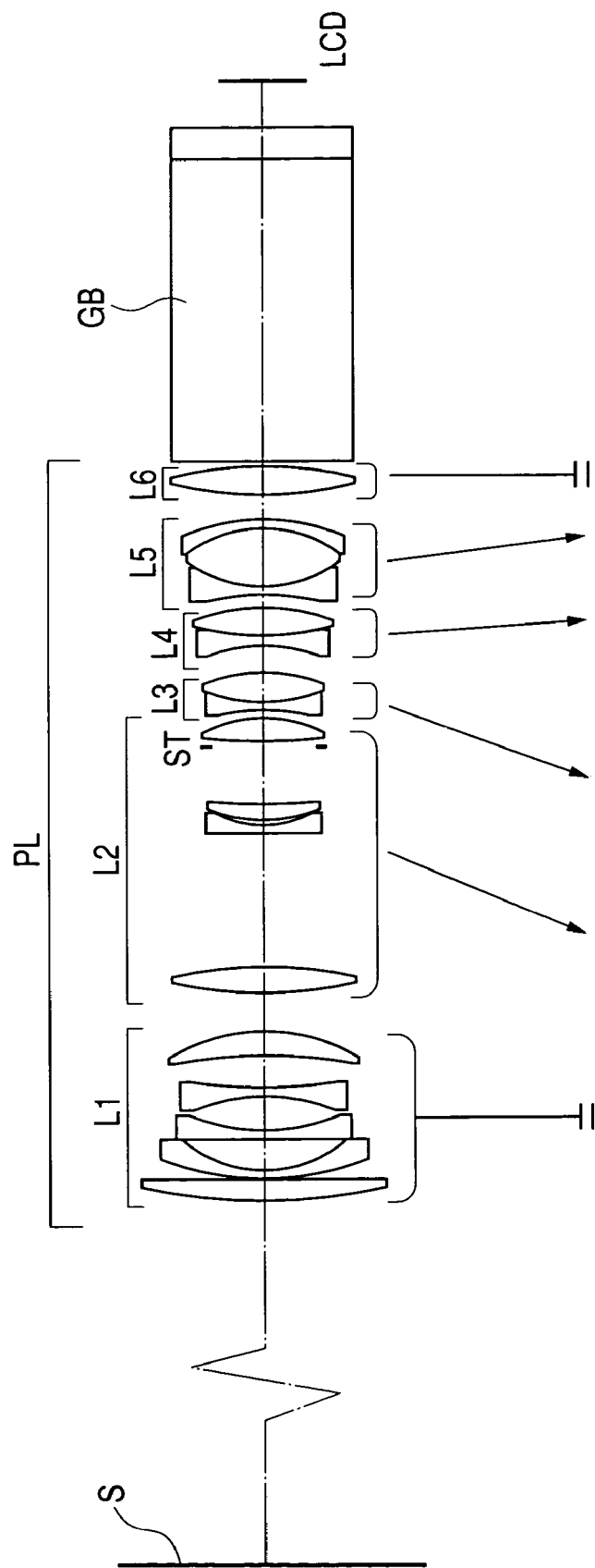
FIG. 3 is a schematic view of main portions of an image projection apparatus using a variable-power optical system of Numerical Embodiment 2.
Figure 4A:
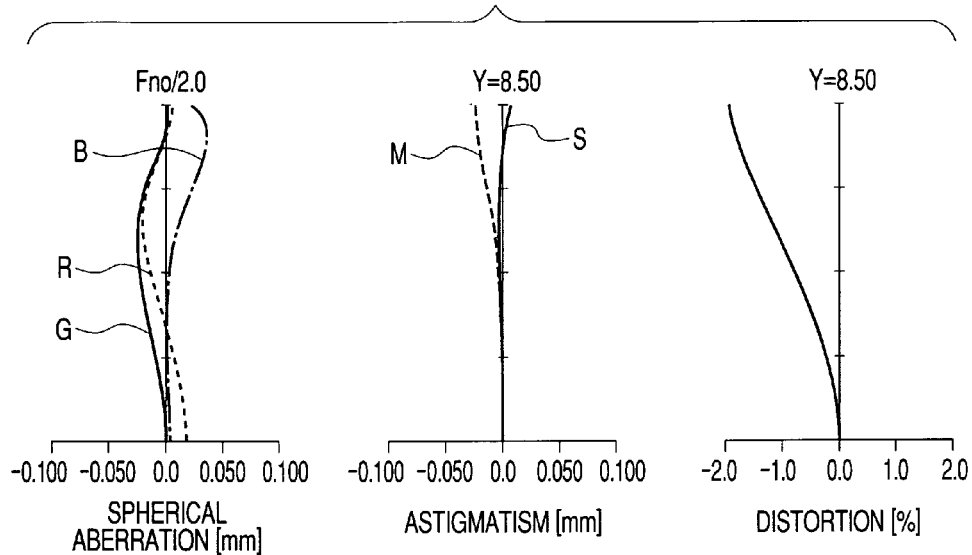
FIGS. 4A and 4B are aberration graphs of the variable-power optical system of Numerical Embodiment 2.
Figure 4B:
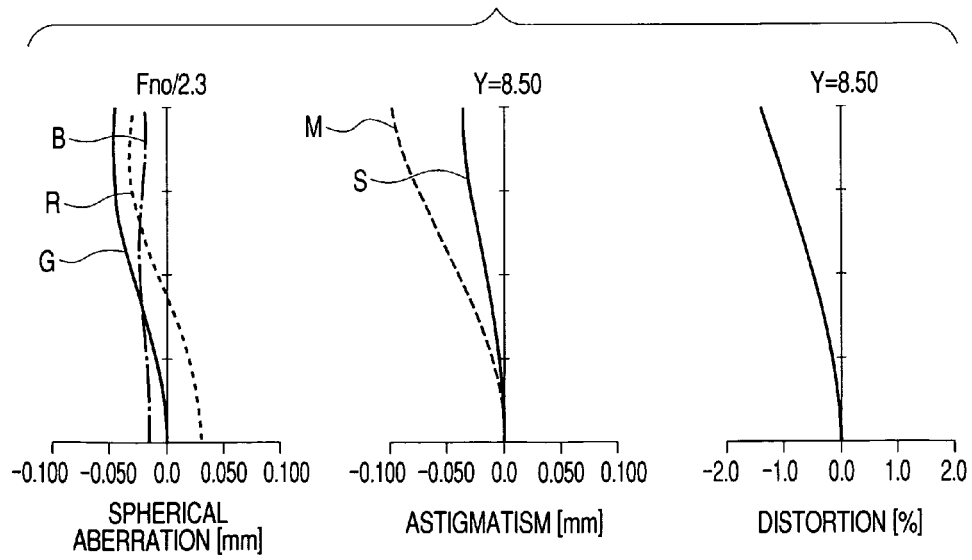

FIG. 3 is a schematic view of main portions of an image projection apparatus (liquid crystal video projector) using a zoom lens according to Embodiment 2 of the present invention. FIGS. 4A and 4B are aberration graphs at a wide angle end (short focal-length end) and a telescope end, (long focal-length end) at the object distance (distance from a first lens unit to the screen) of 1.8 m when numeric values of Numerical Embodiment 2 described later, which corresponds to Embodiment 2 of the present invention, is expressed in millimeters.

Figure 5:
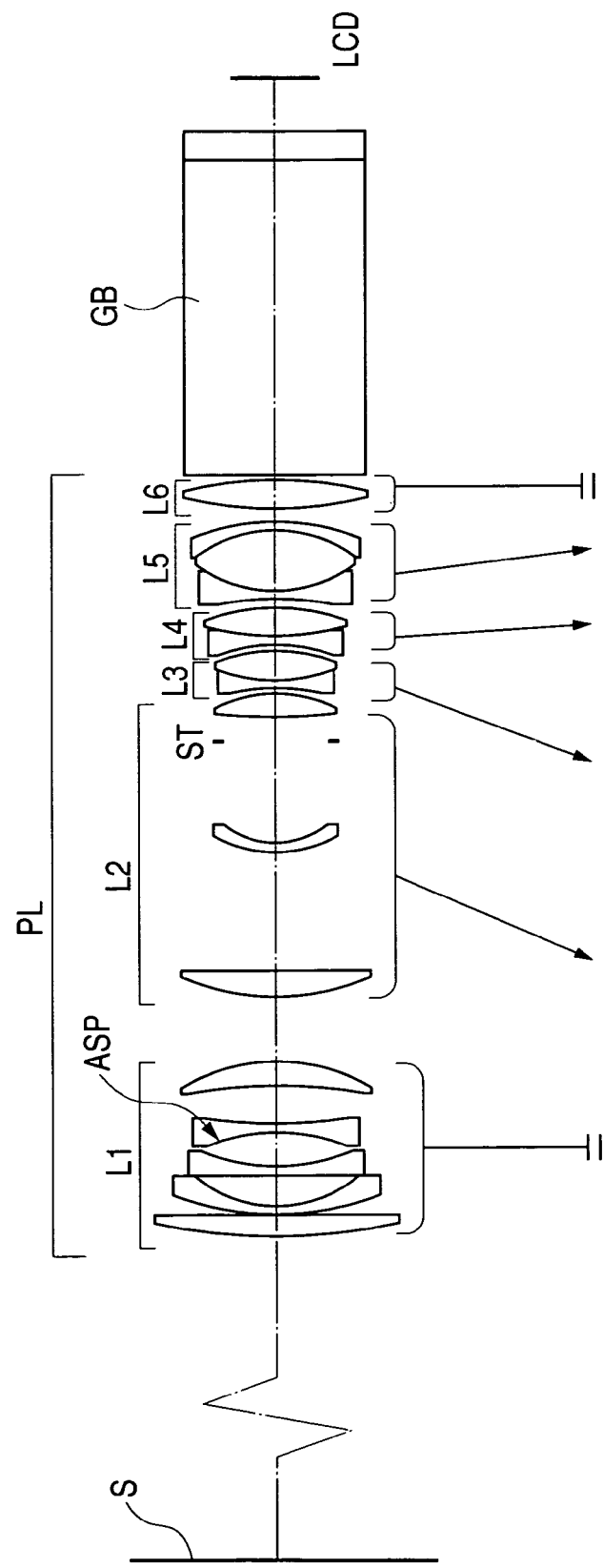
FIG. 5 is a schematic view of main portions of an image projection apparatus using a variable-power optical system of Numerical Embodiment 3.
Figure 6A:
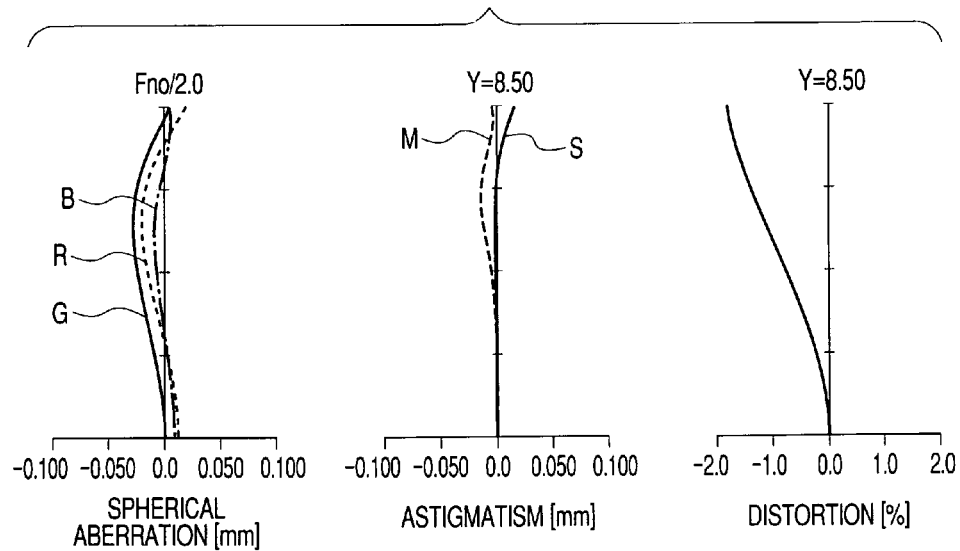
FIGS. 6A and 6B are aberration graphs of the variable-power optical system of Numerical Embodiment 3.
Figure 6B:
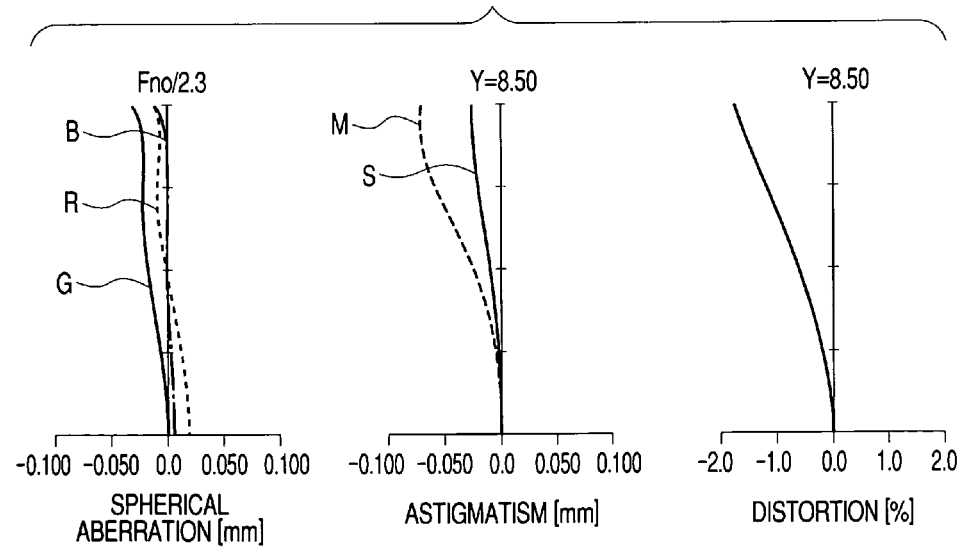
Figure 9:
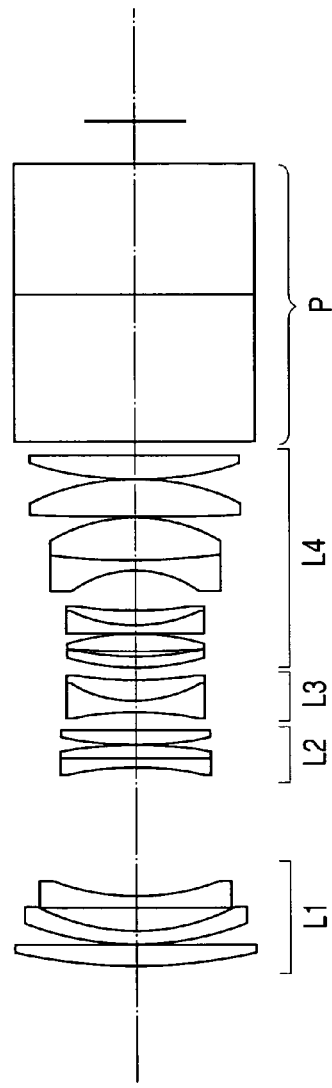
FIG. 9 is a schematic view of main portions of an image projection apparatus using a projection optical system of Numerical Embodiment 6.
Figure 10:
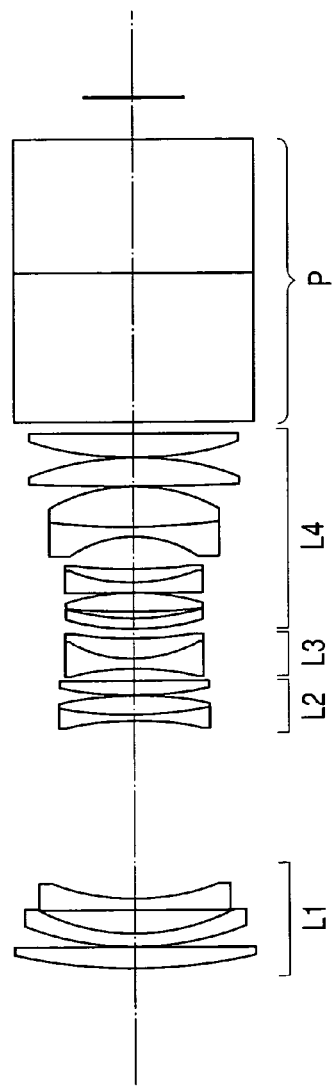
FIG. 10 is a schematic view of main portions of an image projection apparatus using a projection optical system of Numerical Embodiment 7.
Figure 13:
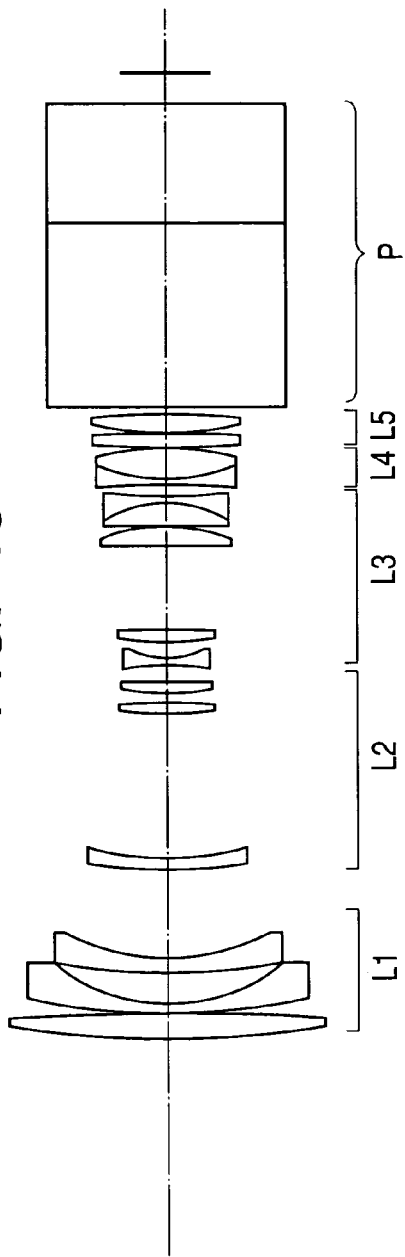
FIG. 13 is a schematic view of main portions of an image projection apparatus using a projection optical system of Numerical Embodiment 10.
Figure 14:
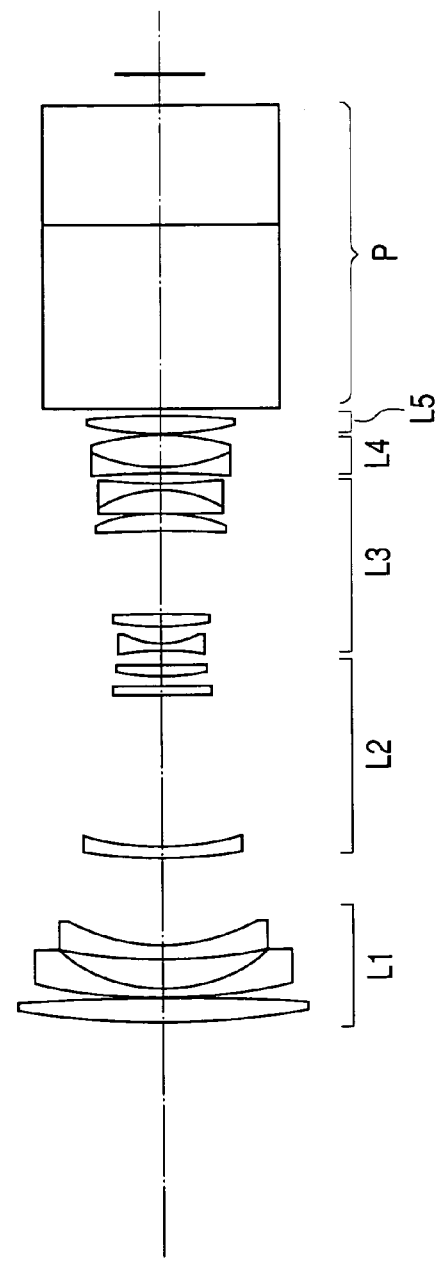
FIG. 14 is a schematic view of main portions of an image projection apparatus using a projection optical system of Numerical Embodiment 11.
Figure 15:
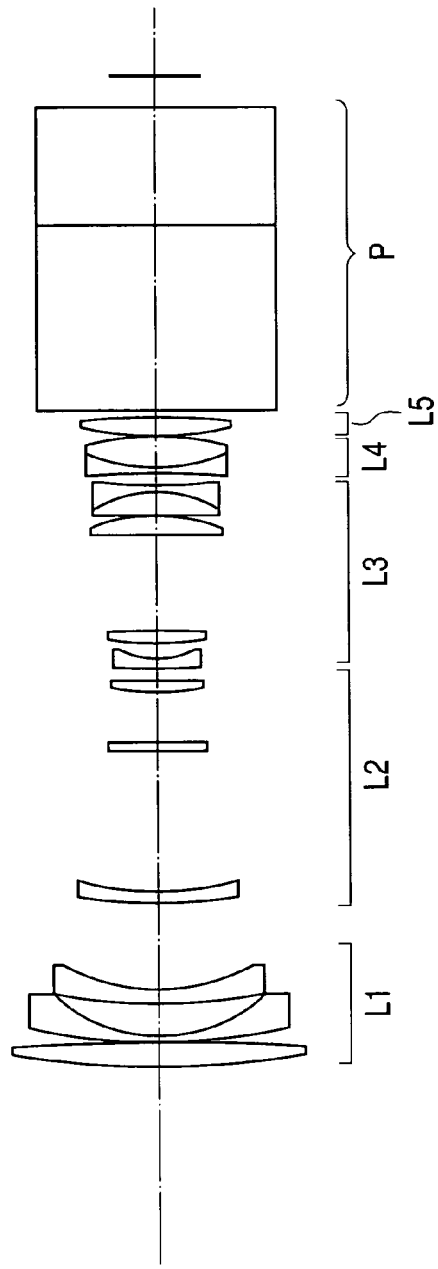
FIG. 15 is a schematic view of main portions of an image projection apparatus using a projection optical system of Numerical Embodiment 12.
Figure 16:
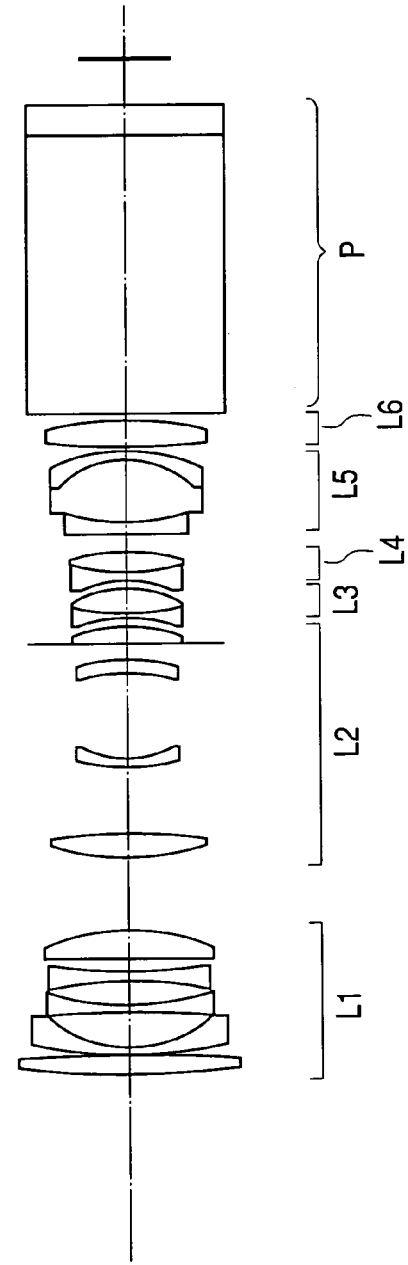
FIG. 16 is a schematic view of main portions of an image projection apparatus using a projection optical system of Numerical Embodiment 13.
Figure 17A:
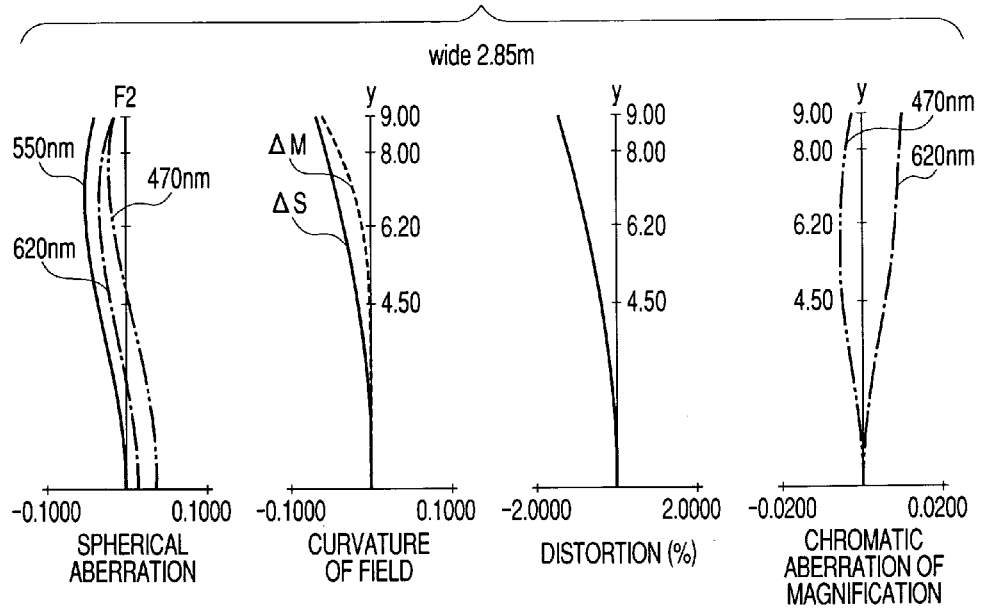
FIGS. 17A and 17B are aberration graphs of the projection optical system of Numerical Embodiment 4.
Figure 17B:
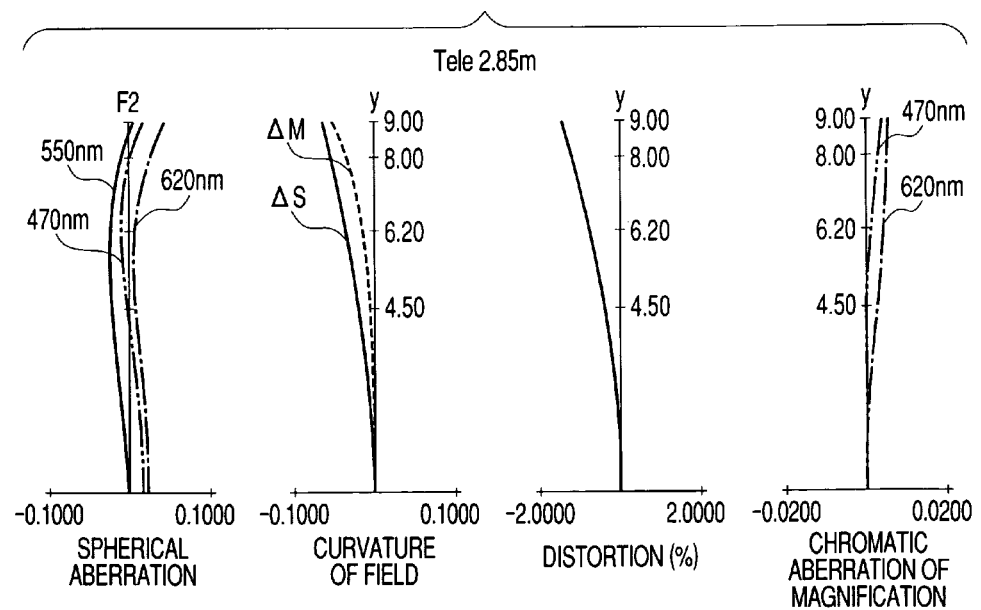
Figure 18A:
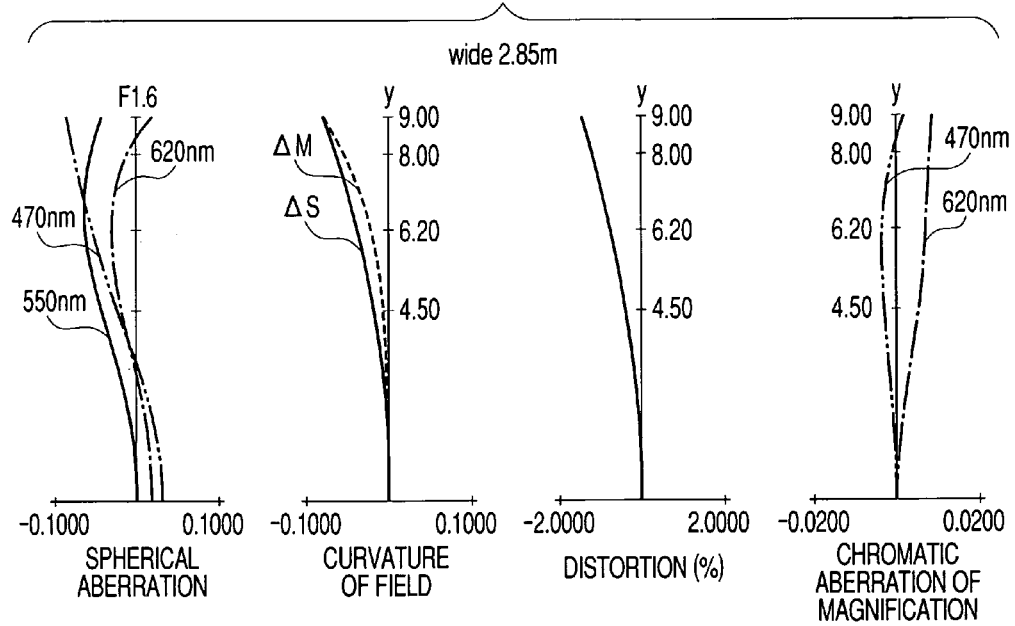
FIGS. 18A and 18B are aberration graphs of the projection optical system of Numerical Embodiment 5.
Figure 18B:
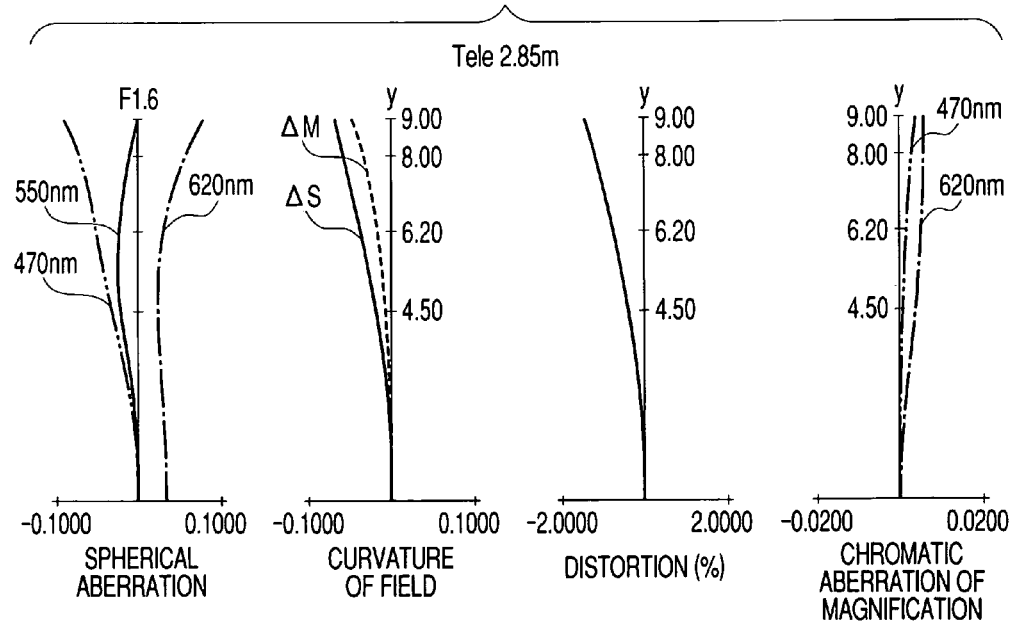
Figure 20A:
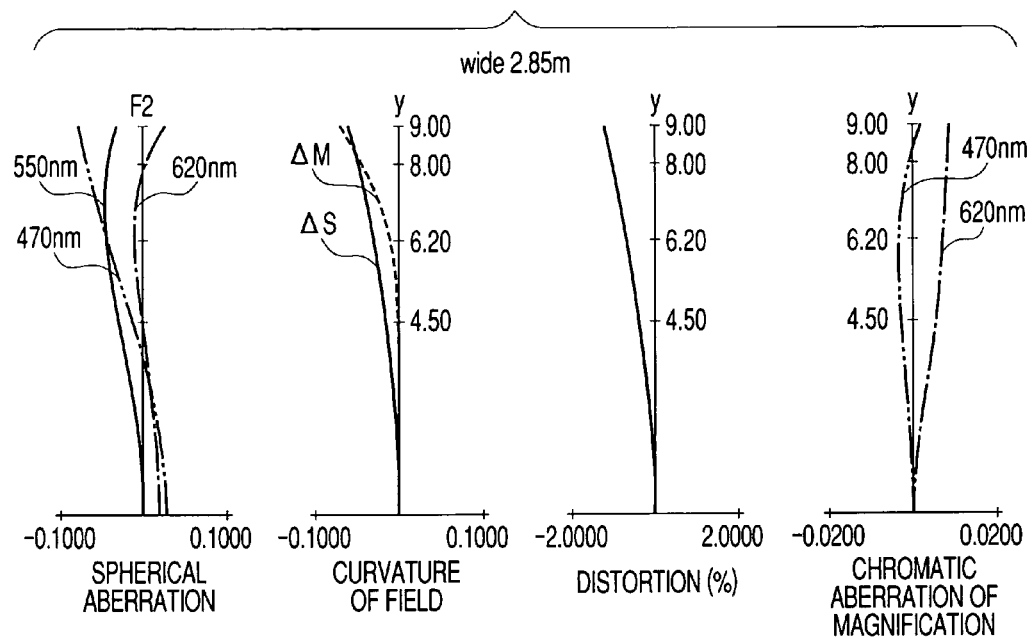
FIGS. 20A and 20B are aberration graphs of the projection optical system of Numerical Embodiment 7.
Figure 20B:
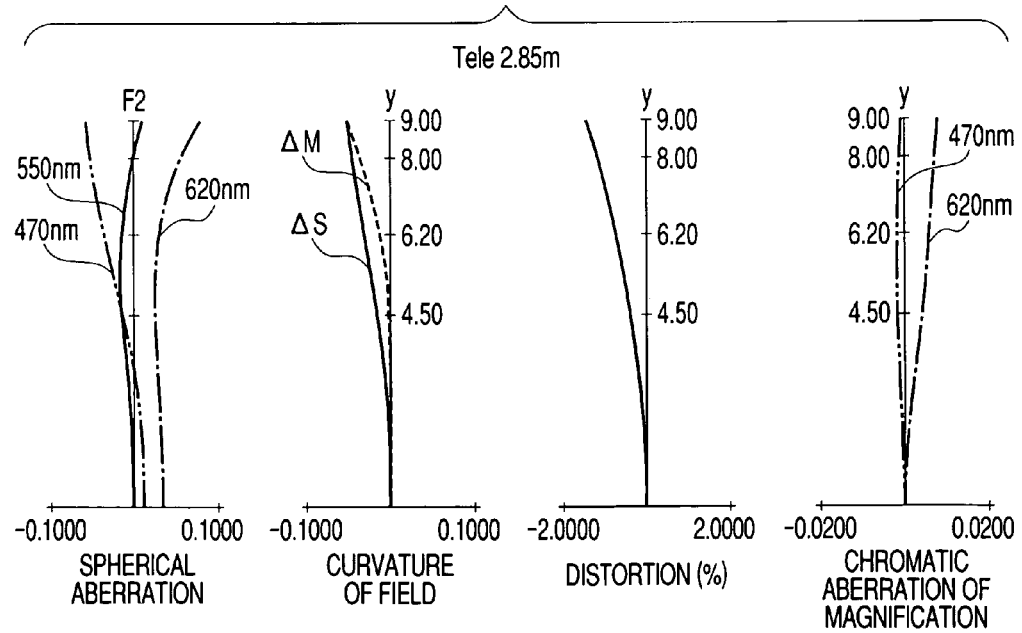
Figure 21A:
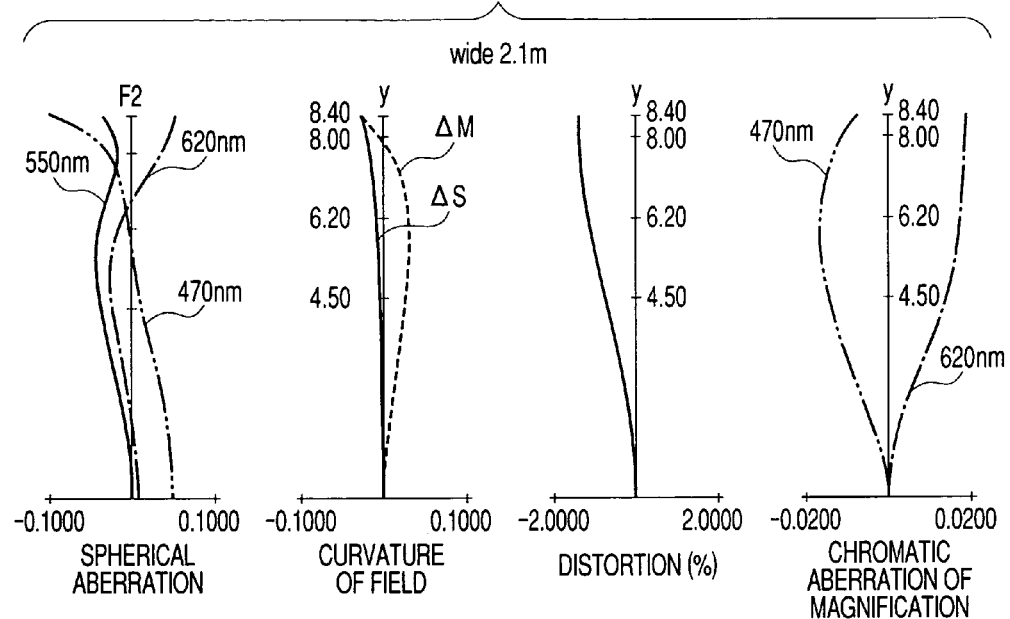
FIGS. 21A and 21B are aberration graphs of the projection optical system of Numerical Embodiment 8.
Figure 21B:
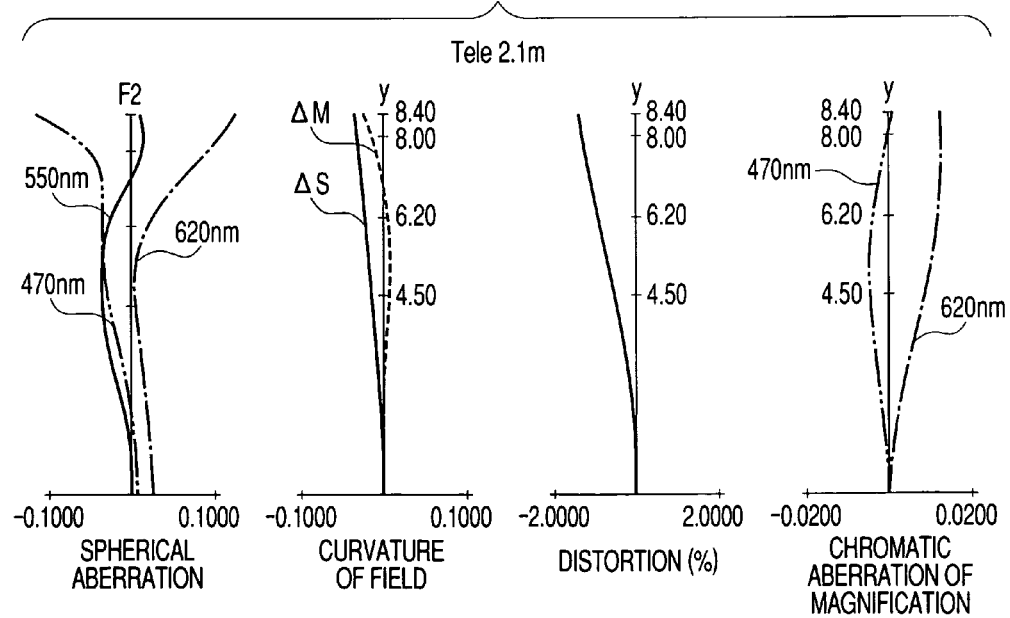
Figure 22A:
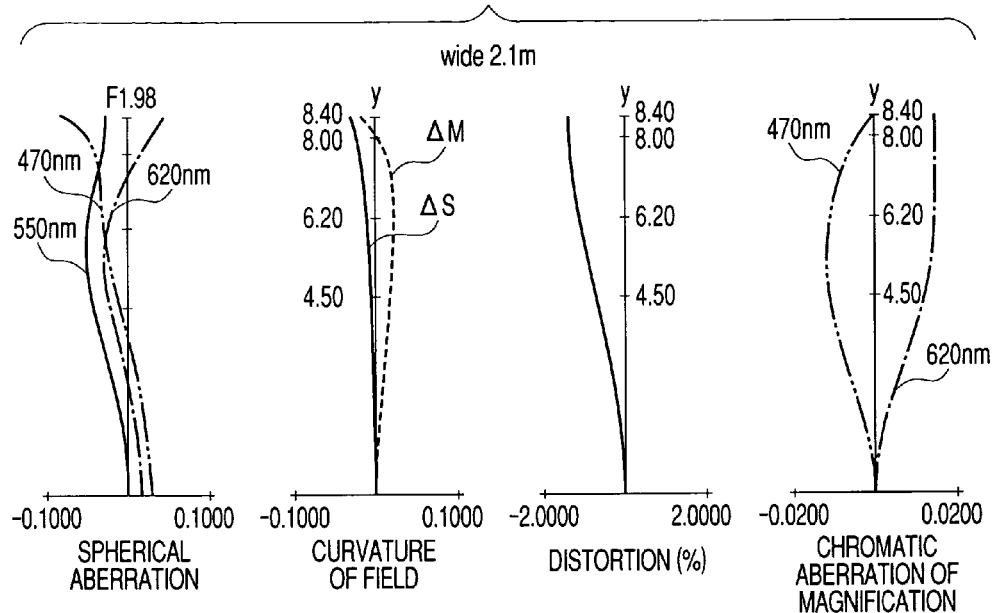
FIGS. 22A and 22B are aberration graphs of the projection optical system of Numerical Embodiment 9.
Figure 22B:
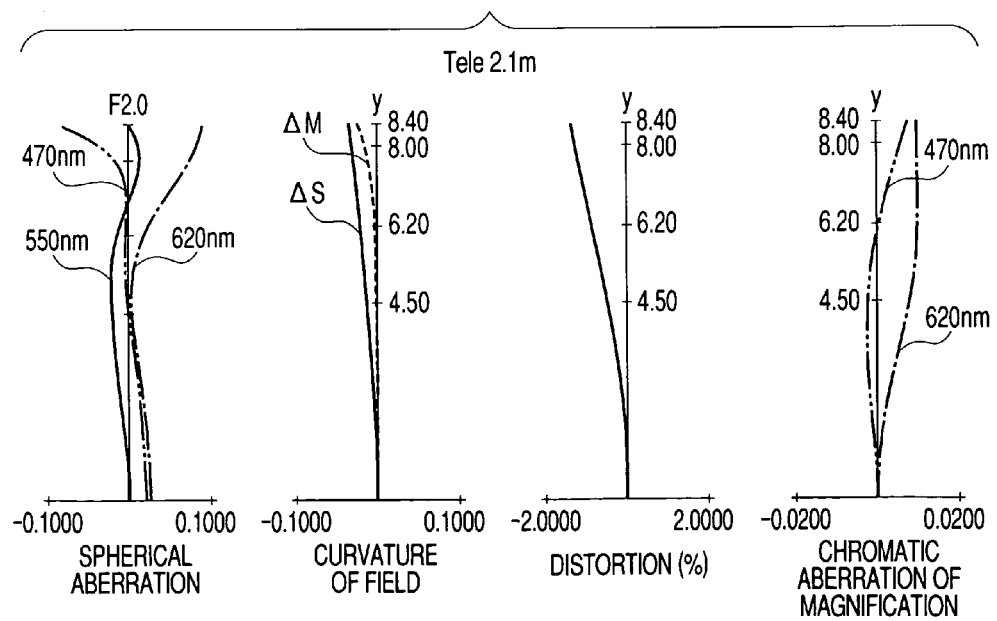
Figure 24A:
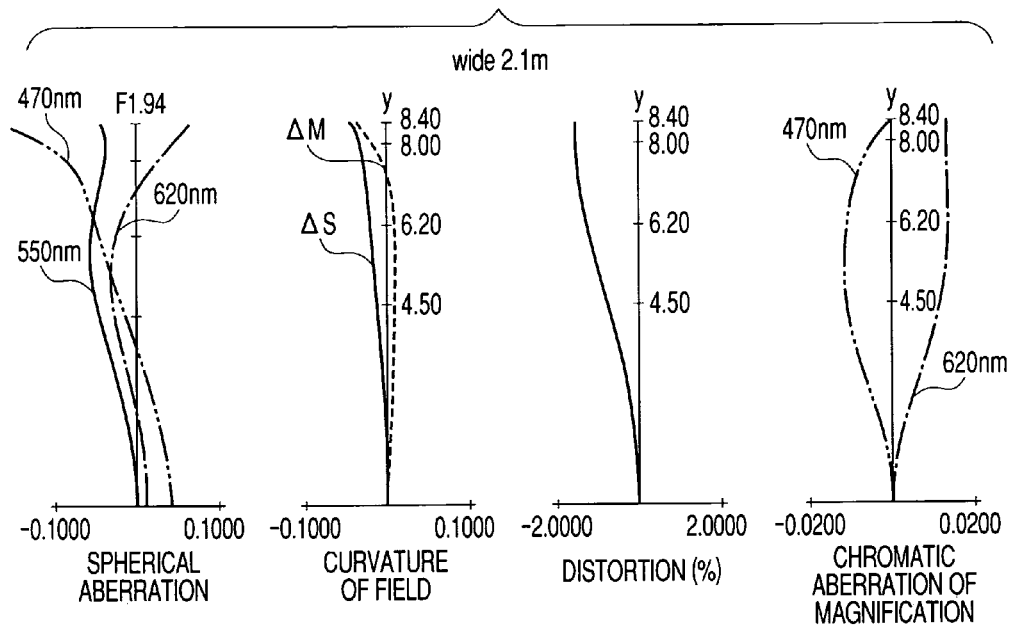
FIGS. 24A and 24B are aberration graphs of the projection optical system of Numerical Embodiment 11.
Figure 24B:
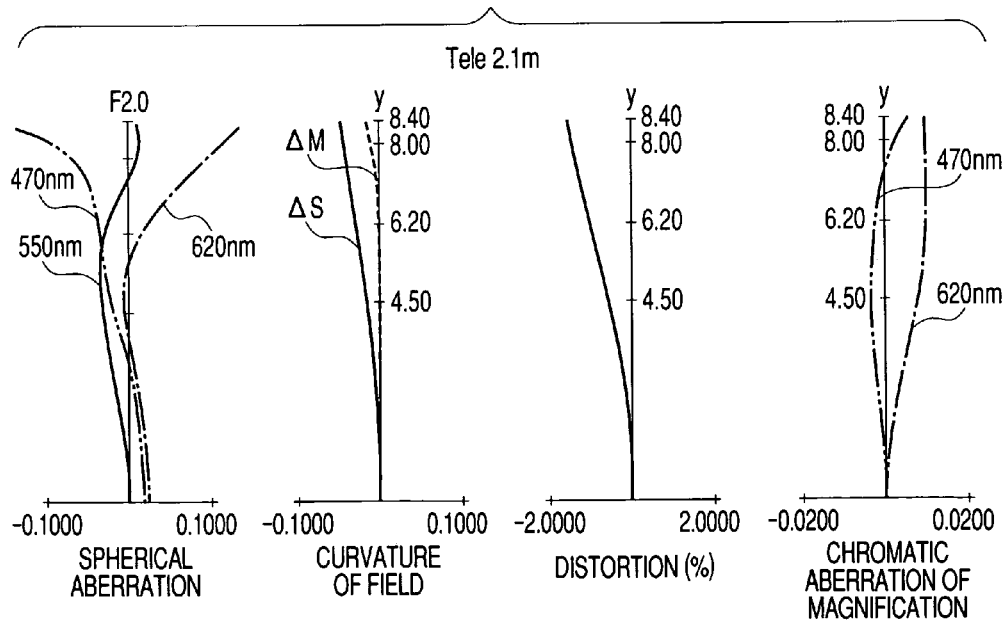
Figure 25A:
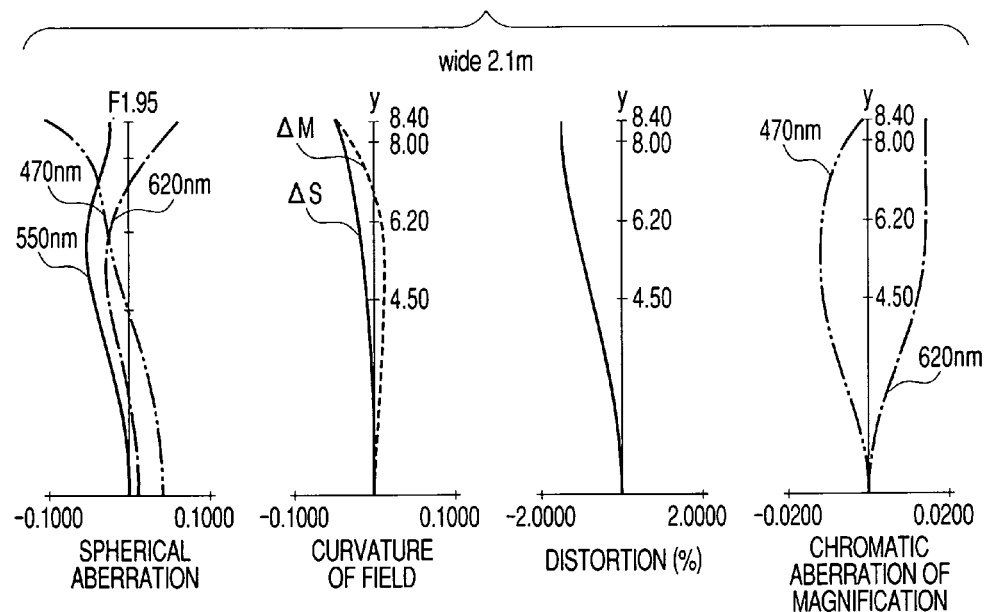
FIGS. 25A and 25B are aberration graphs of the projection optical system of Numerical Embodiment 12.
Figure 25B:
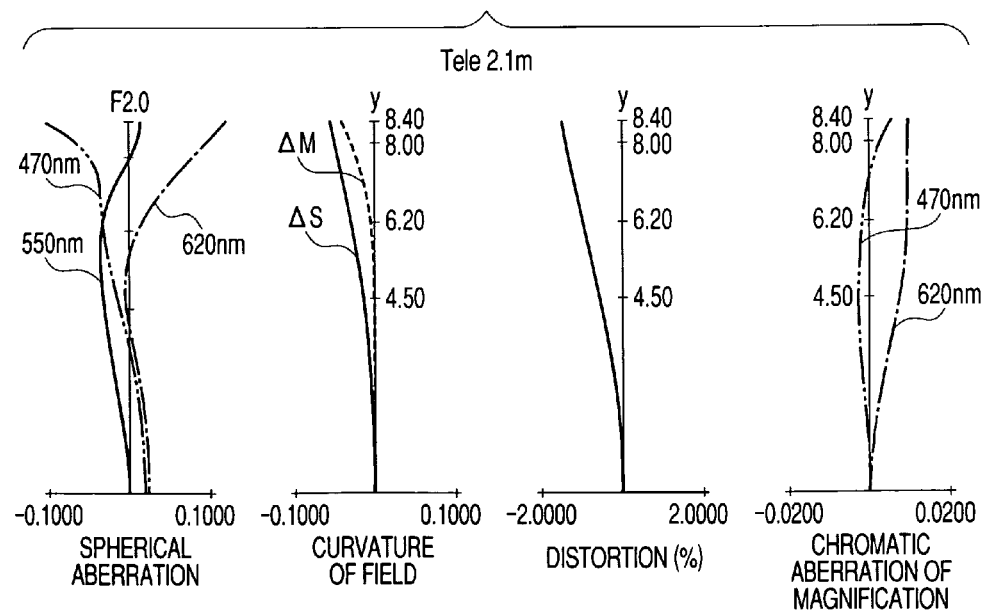
Figure 26A:
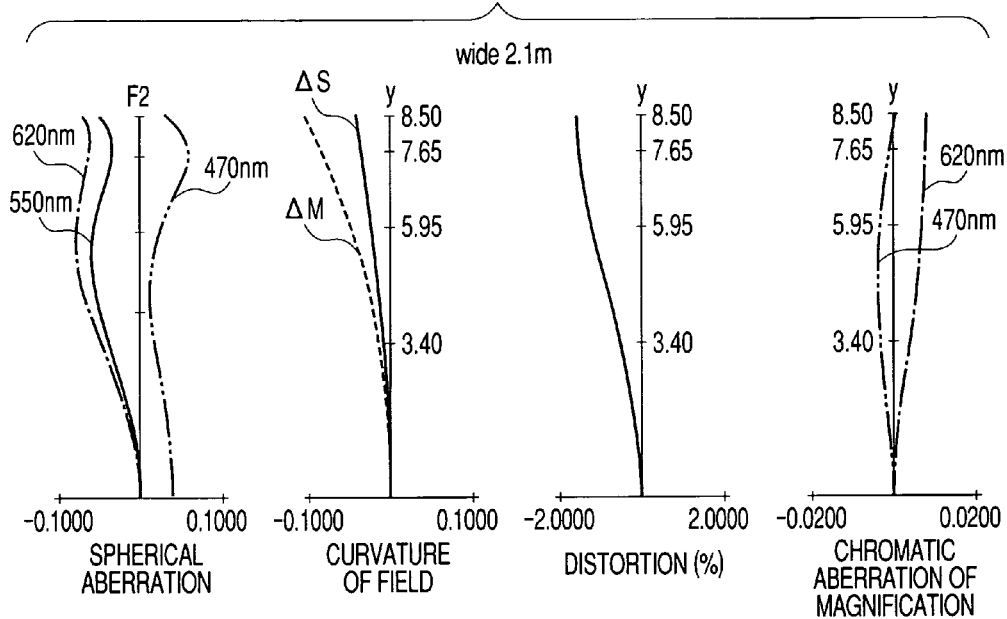
FIGS. 26A and 26B are aberration graphs of the projection optical system of Numerical Embodiment 13.
Figure 26B:
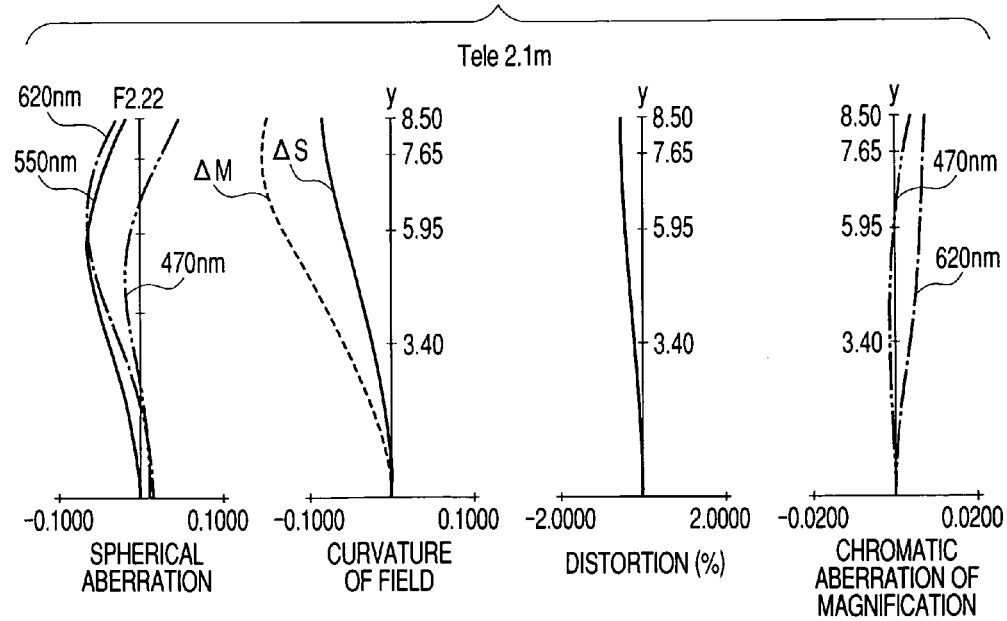

FIG. 5 is a schematic view of main portions of an image projection apparatus (liquid crystal video projector) using a zoom lens according to Embodiment 3 of the present invention. FIGS. 6A and 6B are aberration graphs at a wide angle end (short focal-length end) and a telescope end (long focal-length end) at the object distance (distance from a first lens unit to the screen) of 1.8 m when numeric values of Numerical Embodiment 3 described later, which corresponds to Embodiment 3 of the present invention, is expressed in millimeters.

FIGS. 1, 3, and 5 show a state where the image projection apparatus of Embodiments 1 to 3, respectively, enlarges by use of a zoom lens (projection lens) PL, an original image (image to be projected) displayed on a liquid crystal panel LCD and the like, and projects the enlarged original image on a screen surface S.

Reference symbol S denotes the screen surface (projection surface), and reference symbol LCD denotes the liquid crystal panel (liquid crystal display element) or the like having an original image (image to be projected) displayed thereon. The screen surface S and the liquid crystal panel (original image) LCD are in a conjugate relationship, and in general, the screen surface S corresponds to an enlargement side (front side) at a longer-distance conjugate point (first conjugate point), and the original image LCD corresponds to a reduction side (rear side) at a shorter-distance conjugate point (second conjugate point).

Reference symbol GB denotes a glass block provided in terms of design, which corresponds to a color synthesis prism, a polarizing filter, a color filter, or the like.

The zoom lens PL is attached onto a liquid crystal video projector body (not shown) with a connecting member (not shown) interposed therebetween. Components arranged behind the glass block GB on the liquid crystal display element LCD side are included in the liquid crystal video projector body.

Reference symbol L1 denotes a first lens unit having negative refractive power (optical power=inverse number of focal length); L2, a second lens unit having positive refractive power; L3, a third lens unit having negative refractive power; L4, a fourth lens unit having negative or positive refractive power; L5, a fifth lens unit having negative refractive power; and L6, a sixth lens unit having positive refractive power. The fourth lens unit L4 has negative refractive power in Embodiments 1 and 3, and has positive refractive power in Embodiment 2. Reference symbol ST denotes an aperture stop, which is provided in the second lens unit L2.

In each of Embodiments, at the time of zooming from the wide angle end to the telescope end, as indicated by arrows, the second lens unit L2 and the third lens unit L3 are moved toward the screen S side, and the fourth lens unit L4 and the fifth lens unit L5 are moved toward the original image LCD side. All the movements are made independently of one another. For the zooming, the first lens unit L1 and the sixth lens unit L6 are not moved. However, the first lens unit L1 is moved along an optical axis for focusing. Note that the focusing may be performed by moving the liquid crystal panel LCD.

A multilayer coating is applied on each lens surface, thus preventing a reduction in illuminance on the screen surface S.

In the aberration graphs of FIGS. 2A, 2B, 4A, 4B, 6A and 6B, reference symbol G denotes an aberration at a wavelength of 550 nm, reference symbol R denotes an aberration at a wavelength of 620 nm, and reference numeral B denotes an aberration at a wavelength of 450 nm. Reference symbol S denotes an inclination of a sagittal image plane, reference symbol M denotes an inclination of a meridional image plane, and both indicate aberrations at the wavelength of 550 nm. Reference symbol Y denotes an image height, and reference symbol Fno denotes an F number.

Next, features of each embodiment will be described.

Each embodiment has a feature that six lens units are provided as a whole, and that at least four lens units are moved at the time of zooming from the wide angle end to the telescope end.

Each embodiment adopts a configuration of a negative lead type in which a lens unit having negative refractive power is arranged in the front, thus making it easy to attain a wide angle of view and ensure a long back focus. Moreover, the movable lens units for the zooming are set as four components to correct aberration variations due to the zooming to thereby obtain wide optical performance over an entire variable-power range.

Moreover, for the zooming, both of the first and sixth lens units are fixed with respect to the image surface (LCD), and an overall zoom length is set invariable. Thus, rigidity of a projection lens portion is ensured, and moreover, the lens unit (first lens unit) having a large effective diameter is fixed at the time of zooming to thereby reduce changes in weight balance and allow an advantageous operation in terms of a mechanism of the variable-power optical system.

Provided that a focal length of the first lens unit L1 is represented by f1, a back focus thereof in air is represented by bf, and a focal length of an overall system at the wide angle end is represented by fw, the following conditional expression is satisfied:

$$1.7 < bf/(|f1| \cdot fw)^{1/2} < 2.3 \quad (1)$$

The conditional expression (1) indicates a condition for obtaining a sufficiently long back focus as well as realizing the wider angle of view. When a value of the conditional expression (1) exceeds the upper limit, the refractive power of the first lens unit L1 becomes too strong, and it becomes difficult to correct aberrations particularly in an off-axis ray. On the contrary, when the value of the conditional expression (1) is lower than the lower limit, the optical power (inverse number of focal length) of the first lens unit L1 becomes weak, and accordingly, a lens diameter tends to be increased, and moreover, an overall length of the lens unit is elongated. This is not preferable from a viewpoint of a mechanical structure of the variable-power optical system.

Moreover, provided that the focal lengths of the first lens unit L1 and the second lens unit L2 are represented by f1 and f2, respectively, the following conditional expression is satisfied:

$$0.5 < |f1|/f2 < 0.9 \quad (2)$$

The conditional expression (2) represents a properly set relationship between the second lens unit L2 and the first lens unit L1, which are main variable-power lens units. When a value of the conditional expression (2) exceeds the upper limit, the aberration variations in the zooming are increased, and it becomes difficult to correct the aberrations. Meanwhile, when the value of the conditional expression (2) is lower than the lower limit, a movement of the second lens unit L2 is increased at the time of zooming and it becomes difficult to downsize the variable-power optical system.

Moreover, provided that the focal length of the overall system at the wide angle end is represented by fw, and a focal length of the fourth lens unit is represented by f4, the following conditional expression is satisfied:

$$10 < |f4|/fw < 40 \quad (3)$$

The conditional expression (3) represents a condition which defines a magnification of the correction lens unit (compensator) L4 correcting variations of an imaging position accompanying zooming. When a value of the conditional expression (3) is lower than the lower limit, the refractive power of the fourth lens unit L4 becomes too strong, and the back focus becomes longer than necessary, making it difficult to obtain the compact variable-power optical system more compact, which is not preferable. On the contrary, when the value of the conditional expression (3) exceeds the upper limit, the refractive power of the fourth lens unit L4 becomes too weak, and a movement thereof in the zooming is increased, which is not preferable.

Moreover, the sixth lens unit L6 is composed of one or more positive lenses. When the smallest Abbe number among Abbe numbers of a material constituting the one or more positive lenses is v6p, the following conditional expression is satisfied:

$$v6p < 30 \quad (4)$$

The conditional expression (4) represents a condition when a highly dispersive material is used for the positive lens. Such a biconvex, highly dispersive positive lens with high refractive power is used, and thus the sixth lens unit L6 imparts telecentric property to the image surface, and simultaneously, operates to restrict an occurrence of a high-order chromatic aberration of magnification, which may occur in the fifth lens unit L5. When a value of the conditional expression (4) exceeds the upper limit, the dispersion of the positive lens becomes low, and it becomes difficult to sufficiently correct the chromatic aberration of magnification. Furthermore, widely used glass tends to lower refractive power thereof as dispersion thereof is lowered. Accordingly, it becomes difficult to obtain sufficient telecentric property.

Note that, in order to correct the aberration and to achieve the downsizing of the overall image projection apparatus, it is recommended to set ranges of the numeric values of the above-mentioned conditional expressions (1) to (4) as follows:

$$1.9 < bf/(|f1| \cdot fw)^{1/2} < 2.2 \quad (1a)$$

$$0.55 < |f1|/f2 < 0.8 \quad (2a)$$

$$11 < |f4|/fw < 38 \quad (3a)$$

$$v6p < 28 \quad (4a)$$

In each of Embodiments, the first lens unit L1 is composed, sequentially from the front to the rear, of a biconvex positive lens, a negative meniscus lens facing a convex surface toward the front, two negative lenses, and a positive meniscus lens facing a convex surface rearward. In such a way, the positive lens is arranged on the forefront in the first lens unit L1, thus correcting a distortion mainly at a zoom position of the wide angle end in a favorable manner.

Moreover, in order to restrict the high-order chromatic aberration of magnification, a material in which chromatic dispersion is large (an Abbe number is small) is used for the rearmost positive lens in which a height of the off-axis ray is small. Moreover, the three negative lenses arranged between the two positive lenses of the first lens unit L1 are configured into the above-described shapes so that the refractive powers on the respective lens surfaces of the three negative lenses are divided and that the distortions, astigmatisms, and chromatic aberrations by the negative lenses are minimized.

The second lens unit L2 is composed of a positive lens, a negative lens, an aperture stop, and a biconvex positive lens (Embodiments 1 and 3), or alternatively, composed of a biconvex positive lens, a negative lens, a positive lens, an aperture stop, and a biconvex positive lens (Embodiment 2).

The third lens unit L3 is composed of a lens formed by bonding a biconcave negative lens and a biconvex positive lens to each other.

The second lens unit L2 and the third lens unit L3 function as main variable-power lens units and have given large refractive powers. To that end, a glass material having a high refractive index is used for the positive lenses, and a Petzval sum and the variations of the aberrations such as spherical aberrations at the time of zooming are reduced. When the lenses of the lens units have large diameters and high resolution is required, a backward depth of the image surface is made shallow. When a curvature of field and the astigmatism at an intermediate image height or the like are large, a resolution is abruptly deteriorated. For this reason, the second lens unit L2 is composed as described above, thus correcting the Petzval sum to be small.

In particular, for color blurring, also in order to sufficiently correct the chromatic aberration of magnification in the wide visible light range, a lanthanum-based dense flint glass material or the like having anomalous dispersion property is used for the positive lenses, thus performing the corrections efficiently.

Note that the aperture stop ST is present in the second lens unit L2, and moves together with the second lens unit L2 at the time of zooming, thus restricting off-axis aberration variations at the time of zooming.

The fourth lens unit L4 is composed of a biconcave negative lens and a biconvex positive lens.

The fourth lens unit L4 functions to correct a movement of a pint surface along with zooming. In the entire range of zooming (entire zoom region), magnification of the fourth lens unit L4 is at least 1-fold magnification, and at the time of zooming from the wide angle end to the telescope end, the fourth lens unit L4 moves backward.

The fifth lens unit L5 is composed of a negative lens, a biconvex positive lens, and a negative meniscus lens facing a convex surface rearward, sequentially from the front to the rear. Each of these lenses includes an independent lens or a cemented lens formed by bonding two or more lenses together.

The lens having strong negative refractive power is arranged at a position where an incident height of an on-axis ray in front of the fifth lens unit L5 arranged on the reduction side as viewed from the aperture stop ST takes the smallest value, and thus the Petzval sum is minimized efficiently. Furthermore, the cemented lens composed of two or three lenses is employed, and thus it is facilitated to correct the chromatic aberration of magnification. Moreover, a relatively small curvature is imparted to each lens, and thus a sensitivity, which is prone to be a problem of production, is depressed.

In each embodiment, the fifth lens unit L5 is constituted by a cemented lens composed of three lenses, and strong negative refractive powers are given to two lenses having small curvatures and sandwiching the biconvex positive lens. By these strong negative refractive powers, the Petzval sum is reduced efficiently. Moreover, the cemented lens are employed, and thus the fifth lens unit L5 functions to restrict the chromatic aberration of magnification. Furthermore, a main plane position can be set on the liquid crystal display element LCD side. Accordingly, the fifth lens unit L5 is advantageously operated in terms of ensuring good telecentric performance and back focus with regard to the pupil.

The sixth lens unit L6 is composed of a biconvex positive lens. For this positive lens, it is recommended to use a material having a high refractive index as a glass material in order to gently refract a ray kicked up by the negative-refractive-power lens unit arranged on the reduction side as viewed from the aperture stop ST and to impart the good telecentric performance thereto. With this structure, it is easy to reduce the Petzval sum. Moreover, the sixth lens unit L6 uses a highly dispersive positive lens with high refractive power, imparts the telecentric property to the image plane, and simultaneously, operates to restrict the occurrence of the high-order chromatic aberration of magnification, which may occur in the negative lenses of the fifth lens unit L5.

In order to downsize the overall optical system, it is necessary to increase the refractive power of each lens unit. In order to correct an increase of various aberrations accompanying the increase of the refractive power in this case, it is preferable to employ at least one aspherical lens inside the projection lens PL. Specifically, in Embodiment 3 of FIG. 5, a front lens surface of the fourth negative lens counted from the front lens in the first lens unit L1, is made aspherical.

Although it is preferable that the aspherical lens be of a glass mold type or a replica, the aspherical lens may be a plastic aspherical lens depending on a target resolution and sensitivity of the aspherical lens. Although depending on aberrations to be eliminated, it is effective to employ the aspherical lens at a position as far as possible from the aperture stop ST, such as a position of the first, fifth, or sixth lens unit, in order to correct mainly off-axis aberrations such as the curvature of field and the astigmatism in a favorable manner.

With regard to the aperture stop ST, primarily, it is recommended to provide a moving stop unit independently. However, when production requirements including an addition of a cam groove are also taken into account, it is recommended to arrange the aperture stop ST in the variable-power lens unit such as the second and third lens units. According to this, the aberration variations at the time of zooming can be corrected efficiently.

As described above, according to the respective Embodiments, a retrofocus-type zoom lens, which is large in diameter and has good telecentric performance, has high resolution and low distortion, and has a long back focus in which the chromatic aberration of magnification is corrected well in the visible light range, can be realized. Furthermore, a large screen image of 60 inches can be obtained at a short projection distance of 1.8 m.

Numerical Embodiments 1 to 3 corresponding to numeric value data of the zoom lenses of Embodiments 1 to 3 will be shown below. In each Numerical Embodiment, reference symbol i denotes an order of optical surface from the enlargement side (front side); ri, a curvature radius of an i-th optical surface (i-th surface); di, an interval between the i-th surface and an (i+1)-th surface; and ni and vi, a refractive index and Abbe number of a material of the i-th optical member with respect to a d line, respectively. Reference symbol f denotes a focal length, and reference symbol Fno denotes an F number.

Moreover, three surfaces closest to the reduction side in Numerical Embodiments 1 to 3 are surfaces, each constituting the glass block GB corresponding to the color synthesis prism, a face plate, various filters, and the like.

Moreover, when a conic constant is represented by k, aspherical coefficients are represented by A, B, C, and D, and a displacement in an optical axis direction at a position at a height h from the optical axis is represented by x with a surface vertex taken as a reference, an aspherical shape is represented by the following expression.

$$x = \frac{(1/r)h^2}{1+\sqrt{\{1-(1+k)(h/r)^2\}}} + Ah^4 + Bh^6 + Ch^8 + Dh^{10}$$

Note that reference symbol r denotes a paraxial curvature radius. Note that, for example, "e-Z" means "$10^{-z}$".

Relationships between the above-mentioned respective conditional expressions (1) to (4) and various numeric values in Numerical Embodiments 1 to 3 are shown in Table 1.

(Numerical Embodiment 1)

| i | ri | di | ni | vi |
|---|---|---|---|---|
| 1 | 113.900 | 3.811 | 1.72000 | 50.2 |
| 2 | −2324.594 | 0.150 | | |
| 3 | 51.859 | 1.600 | 1.69680 | 55.5 |
| 4 | 23.124 | 6.166 | | |
| 5 | 2309.678 | 1.600 | 1.69680 | 55.5 |
| 6 | 35.836 | 6.493 | | |
| 7 | −36.287 | 1.600 | 1.69680 | 55.5 |
| 8 | 107.216 | 7.128 | | |
| 9 | −95.912 | 4.560 | 1.83400 | 37.2 |
| 10 | −34.286 | (Variable D10) | | |
| 11 | 43.509 | 5.088 | 1.63980 | 34.5 |
| 12 | −1026.440 | 22.982 | | |
| 13 | 24.184 | 1.700 | 1.65160 | 58.6 |
| 14 | 15.689 | 20.56824 | | |
| 15 | (Stop) | 4.33424 | | |
| 16 | 75.917 | 4.468 | 1.51633 | 64.1 |
| 17 | −27.394 | (Variable D17) | | |
| 18 | −52.882 | 1.500 | 1.83400 | 37.2 |
| 19 | 29.124 | 5.708 | 1.51823 | 58.9 |
| 20 | −29.134 | (Variable D20) | | |
| 21 | −28.832 | 1.600 | 1.83400 | 37.2 |
| 22 | 53.636 | 0.150 | | |
| 23 | 43.349 | 5.158 | 1.80518 | 25.4 |
| 24 | −43.359 | (Variable D24) | | |
| 25 | −72.144 | 1.600 | 1.80518 | 25.4 |
| 26 | 24.550 | 11.452 | 1.60311 | 60.6 |
| 27 | −24.560 | 1.600 | 1.80518 | 25.4 |
| 28 | −41.022 | (Variable D28) | | |
| 29 | 73.690 | 5.234 | 1.84666 | 23.8 |
| 30 | −73.680 | 1.000 | | |
| 31 | ∞ | 60.000 | 1.74400 | 44.8 |
| 32 | ∞ | 6.000 | 1.51633 | 64.1 |
| 33 | ∞ | | | |

| Variable | Wide | Middle | Tele |
|---|---|---|---|
| | | Focal length | |
| amount | 15.3 mm | 17.1 mm | 18.2 mm |
| D10 | 12.29 | 4.55 | 0.97 |
| D17 | 1.00 | 3.01 | 4.08 |
| D20 | 1.00 | 7.55 | 11.22 |
| D24 | 2.15 | 1.86 | 1.21 |
| D28 | 2.13 | 1.60 | 1.09 |

Fno = 2.0–2.3

(Numerical Embodiment 2)

| i | ri | di | ni | vi |
|---|---|---|---|---|
| 1 | 123.812 | 3.811 | 1.51633 | 64.1 |
| 2 | −311.006 | 0.150 | | |
| 3 | 52.482 | 1.700 | 1.69680 | 55.5 |
| 4 | 24.197 | 4.815 | | |
| 5 | 116.908 | 1.700 | 1.69680 | 55.5 |
| 6 | 32.549 | 7.522 | | |
| 7 | −29.619 | 1.700 | 1.69680 | 55.5 |
| 8 | 117.550 | 6.366 | | |
| 9 | −123.304 | 4.773 | 1.83400 | 37.2 |
| 10 | −35.252 | (Variable D10) | | |
| 11 | 80.895 | 4.891 | 1.63980 | 34.5 |
| 12 | −90.556 | 26.694 | | |
| 13 | 374.281 | 1.700 | 1.72000 | 50.2 |
| 14 | 19.853 | 1.14497 | | |
| 15 | 28.366 | 2.91551 | 1.61293 | 37.0 |
| 16 | 96.680 | 11.971 | | |
| 17 | (Stop) | 0.300 | | |
| 18 | 50.441 | 4.457 | 1.65844 | 50.9 |
| 19 | −31.225 | (Variable D19) | | |
| 20 | −43.587 | 1.700 | 1.83400 | 37.2 |
| 21 | 31.140 | 4.955 | 1.51633 | 64.1 |
| 22 | −31.150 | (Variable D22) | | |
| 23 | −26.247 | 2.200 | 1.83400 | 37.2 |
| 24 | 58.237 | 0.150 | | |
| 25 | 49.007 | 5.542 | 1.80518 | 25.4 |
| 26 | −29.326 | (Variable D26) | | |
| 27 | −38.974 | 1.700 | 1.80518 | 25.4 |
| 28 | 26.858 | 11.775 | 1.60311 | 60.6 |
| 29 | −19.557 | 2.100 | 1.84666 | 23.8 |
| 30 | −30.998 | (Variable D30) | | |
| 31 | 72.772 | 5.087 | 1.84666 | 23.8 |
| 32 | −88.527 | 1.000 | | |
| 33 | ∞ | 60.000 | 1.74400 | 44.8 |
| 34 | ∞ | 6.000 | 1.51633 | 64.1 |
| 35 | ∞ | | | |

| Variable | Wide | Middle | Tele |
|---|---|---|---|
| | | Focal length | |
| amount | 15.3 mm | 16.3 mm | 18.3 mm |
| D10 | 11.90 | 7.75 | 0.48 |
| D19 | 1.47 | 1.96 | 3.28 |
| D22 | 1.00 | 5.53 | 13.88 |
| D26 | 3.00 | 2.33 | 0.15 |
| D30 | 4.40 | 4.21 | 3.99 |

Fno = 2.0–2.3

(Numerical Embodiment 3)

| i | ri | di | ni | vi |
|---|---|---|---|---|
| 1 | 115.356 | 3.593 | 1.72000 | 50.2 |
| 2 | −1411.068 | 0.065 | | |
| 3 | 50.378 | 1.582 | 1.69680 | 55.5 |
| 4 | 23.001 | 6.117 | | |
| 5 | 1208.830 | 1.790 | 1.69680 | 55.5 |
| 6 | 35.770 | 6.198 | | |
| 7* | −36.326 | 1.626 | 1.69680 | 55.5 |
| 8 | 92.829 | 7.506 | | |

-continued (Numerical Embodiment 3)

| | | | | |
|---|---|---|---|---|
| 9 | −106.651 | 4.537 | 1.83400 | 37.2 |
| 10 | −35.136 | (Variable D10) | | |
| 11 | 43.718 | 5.028 | 1.63980 | 34.5 |
| 12 | −895.592 | 22.986 | | |
| 13 | 23.758 | 1.702 | 1.65160 | 58.6 |
| 14 | 15.326 | 19.386 | | |
| 15 | (Stop) | 4.52962 | | |
| 16 | 73.460 | 4.509 | 1.51633 | 64.1 |
| 17 | −26.599 | (Variable D17) | | |
| 18 | −51.513 | 1.616 | 1.83400 | 37.2 |
| 19 | 29.012 | 5.719 | 1.51823 | 58.9 |
| 20 | −29.072 | (Variable D20) | | |
| 21 | −29.187 | 1.605 | 1.83400 | 37.2 |
| 22 | 51.207 | 0.150 | | |
| 23 | 42.108 | 5.421 | 1.80518 | 25.4 |
| 24 | −42.704 | (Variable D24) | | |
| 25 | −68.804 | 1.605 | 1.80518 | 25.4 |
| 26 | 24.157 | 11.464 | 1.60311 | 60.6 |
| 27 | −24.499 | 1.702 | 1.80518 | 25.4 |
| 28 | −41.387 | (Variable D28) | | |
| 29 | 73.388 | 5.224 | 1.84666 | 23.8 |
| 30 | −72.276 | 1.000 | | |
| 31 | ∞ | 60.000 | 1.74400 | 44.8 |
| 32 | ∞ | 6.000 | 1.51633 | 64.1 |
| 33 | ∞ | | | |

| Variable | Wide | Middle Focal length | Tele |
|---|---|---|---|
| amount | 15.3 mm | 17.1 mm | 18.1 mm |
| D10 | 12.24 | 4.58 | 0.99 |
| D17 | 1.00 | 2.79 | 3.77 |
| D20 | 1.00 | 7.56 | 11.20 |
| D24 | 1.54 | 1.30 | 0.66 |
| D28 | 2.02 | 1.54 | 1.07 |

Fno = 2.0–2.3

7th surface★: Glass mold-type aspherical surface; aspherical coefficients thereof are as follows
$1/r = -2.75286e-02$  $K = -2.89758e-02$
$A = -1.24937e-07$
$B = 3.2469e-09$
$C = -2.37336e-11$
$D = 5.25583e-14$

TABLE 1

| | Numerical Embodiment | | |
|---|---|---|---|
| Conditional Expression | 1 | 2 | 3 |
| (1) $bf/(|f1| \cdot fw)^{1/2}$ | 2.18 | 2.08 | 2.17 |
| (2) $|f1|/f2$ | 0.57 | 0.74 | 0.59 |
| (3) $|f4|/fw$ | 12.9 | 35.4 | 14.4 |
| (4) ν6p | 23.8 | 23.8 | 23.8 |

(Second Embodiment)

A projection optical system (projection lens) of a second embodiment of the present invention will be described below.

FIGS. 7 to 16 are schematic views of main portions of image projection apparatuses (liquid crystal video projectors) using projection lenses of Embodiments 4 to 13. FIGS. 17A to 26B are aberration graphs at wide angle ends (short focal-length ends) and telescope ends (long focal-length ends) when numeric values of Numerical Embodiments 4 to 13 to be described later, which correspond to Embodiments 4 to 13, are expressed in millimeters. In the aberration graphs, object distances (distances from first lens unit to screen) of Embodiments 4 to 7 are assumed to be 2.85 m, and object distances of Embodiments 8 to 13 are assumed to be 2.1 m.

In each of FIGS. 7 to 16, the left side is a screen side (enlargement conjugate side, front side), and the right side is an original picture side (reduction conjugate side, rear side). Moreover, reference symbol L1 denotes a first lens unit, reference symbol L2 denotes a second lens unit, reference symbol L3 denotes a third lens unit, reference symbol L4 denotes a fourth lens unit, reference symbol L5 denotes a fifth lens unit, and reference symbol L6 denotes a sixth lens unit. Reference symbol P denotes a glass block such as a color separation/color synthesis prism. In Embodiments 4 to 13, this block is shown as being composed of two blocks; however, may be divided into more blocks, or the divided blocks may be provided with appropriate thicknesses and separated at air intervals. This glass block P is one provided in terms of design while a dichroic prism, a polarization splitter element, a color filter, and the like are assumed.

What is shown in the aberration graphs is, from the left, a spherical aberration, a curvature of field, a distortion, and a chromatic aberration of magnification. The aberration graphs show the spherical aberration, the astigmatism (curvature of field), the distortion (%), and the chromatic aberration of magnification, respectively. The aberration graphs affixed with "A" in the figure number show the aberrations at the wide angle end (WIDE), and the aberration graphs affixed with "B" in the figure number show the aberrations at the telescope end (TELE). The spherical aberrations at the wavelengths of 550 nm, 470 nm, and 620 nm are shown. The chromatic aberrations of magnification at the wavelengths of 470 nm and 620 nm are shown with a value at the wavelength of 550 nm taken as a reference. In the astigmatisms, solid lines indicate sagittal cross sections, and chain lines indicate meridional cross sections.

Moreover, the projection optical system of each of Embodiments 4 to 8 is composed of four lens units, which are a negative-refractive-power first lens unit L1, a positive-refractive-power second lens unit L2, a negative-refractive-power third lens unit L3, and a positive-refractive-power fourth lens unit L4. In the projection optical system, the fourth lens unit L4 is fixed during zooming, and an aperture stop is provided in the vicinity of this fourth lens unit L4. In each of Embodiments 4 to 8, the first, second, and third lens units are movable at the time of zooming.

Moreover, among Embodiments 4 to 8, Embodiments 5 and 6 are embodiments of large-diameter projection lenses in which the F numbers are 1.6, and in other Embodiments 4, 7 and 8, the F numbers are set at 2.

Moreover, each of Embodiments 5 and 8 shows an embodiment where a deflection angle θ, on the original picture, of a principal ray at the maximum image height y of the reduction-side conjugate surface (original picture) is present on a negative side, that is, an example where a pupil position viewed from the original picture side, which includes the aberrations, is present on a positive side (more reduction side (rear side) than the original picture). In such a configuration, a diameter of a final lens (lens on the most reduction side) is prone to be enlarged.

Embodiments 9 to 13 are embodiments where the first lens unit L1 and the final lens unit (fifth lens unit L5 or sixth lens unit L6) are fixed and other lens units move at the time of zooming. The aperture stop is present in each of the moving units. Each of Embodiments 9 to 13 is one configured such that variations of the pupil position are restricted while the aperture stop is present in each moving unit.

Embodiments 9 to 13 will be described in detail.

First, Embodiments 9 and 13 show projection optical systems of six-unit configurations, each of which has six lens units having negative, positive, negative, positive, positive, and positive refractive powers sequentially from the enlargement conjugate side.

Embodiments 10 to 12 show projection optical systems of five-unit configurations, each of which has five lens units having negative, positive, negative, positive, and positive refractive powers sequentially from the enlargement conjugate side.

Embodiments 9, 10, and 13 are embodiments where the deflection angle θ, on the original picture, of the principal ray at the maximum image height y of the reduction-side conjugate surface is present on the negative side, that is, an embodiment where the pupil position viewed from the original picture side, which includes the aberrations, is present on the positive side (more reduction side than the original picture).

In each of the projection lenses of Embodiments 4 to 13, in order to elongate the back focus, the negative-refractive-power lens unit (first lens unit) is arranged on the most enlargement side, and the variations of the pupil position at the time of zooming are restricted. In addition, in order to set the pupil far from the original picture (reduction-side conjugate surface) (to make the reduction side telecentric), the positive-refractive-power lens unit which does not move at the time of zooming is arranged on the most reduction side. Moreover, focusing on the screen is performed by moving the first lens unit L1 along the optical axis.

The projection optical system of each of Embodiments 4 to 13 is characterized in that the back focus (distance in air between the lens on the rearmost side (reduction conjugate side) and the original picture) is 2.5 times or more a diameter of an effective image circle (circle surrounding the original picture on the liquid crystal display element and the like), and the following expression is satisfied:

$$|\phi/tk|<0.12 \tag{5}$$

where φ is the diameter of the effective image circle, and tk is a distance at a short focal-length end from the original picture position to a paraxial pupil position viewed from the original picture.

Moreover, when an angle made of the principal ray at the maximum image height at the position of the reduction-side conjugate surface (original picture) and a surface normal line at the position of the reduction-side conjugate surface (original picture) is θ, the projection optical system is configured to satisfy the following expression:

$$|\theta|<0.80 \tag{6}$$

Moreover, when the diameter of the lens on the most reduction conjugate side (rear side) is D, and the back focus (distance in air between the rearmost lens and the original picture) is bf, the projection optical system is configured to satisfy the following expression:

$$0.6<D/bf<0.92 \tag{7}$$

Moreover, it is preferable to constitute the projection optical system so that the diameter D can satisfy the following expression in a relationship with the diameter φ of the above-mentioned effective image circle:

$$1.5<D/\phi<2.5 \tag{8}$$

Moreover, when the focal length of the lens unit arranged on the most reduction conjugate side (rear side) is fk, it is preferable that the following expression be satisfied:

$$0.9<bf/fk<2.0 \tag{9}$$

Moreover, it is preferable that, particularly, the diameter φ of the effective image circle and the back focus bf have the following relationship:

$$0.3<\phi/bf<0.47 \tag{10}$$

The technological meaning of the above conditional expression will be described.

The conditional expression (5) is a condition necessary for the projection lens of this embodiment to capture reflected light on a surface of a display member such as a reflection display element. When the projection lens departs from this condition, it becomes difficult to perform an effective projection on the screen no matter how bright the projection lens may be and no matter how much quantity of peripheral light the projection lens may have.

The above will be described in detail. In the case of using a transmission liquid crystal display element, a principal ray of a luminous flux (center ray of the luminous flux) transmitting through the liquid crystal display element from a light source is set so as to be incident substantially perpendicularly (in a telecentric manner) onto the liquid crystal display element. Hence, when a lens substantially telecentric (in which the pupil distance is sufficiently long) with respect to the luminous flux is used for the projection lens, a loss on the projection lens side substantially depends on a vignetting factor of the projection lens. Specifically, when an effective luminous flux of the projection lens is approximately the same as an illumination luminous flux, it can be said that there is substantially no loss due to the projection lens. The illumination luminous flux and the effective luminous flux of the lens will be independent of each other.

In contrast, in the case of using a reflection liquid crystal display element, unless a principal ray of illumination light from the light source is perpendicular to the liquid crystal display element, the reflected light on the surface of the liquid crystal display element cannot be captured by the projection lens (a reflected ray does not return into the lens), and utilization efficiency of the illumination light is deteriorated more than the vignetting factor of the projection lens. Specifically, in a projection optical system using a reflection liquid crystal display element, it is established that "the reflected light on the liquid crystal display element is equal to the luminous flux captured into the projection lens." When this coincides with an angle extended by an effective diameter of the projection lens, the utilization efficiency of the light will be the best, and the illumination luminous flux and the effective luminous flux of the lens will have a dependency relationship. Briefly speaking, when the luminous flux traveling toward the liquid crystal display element and the luminous flux reflected on the liquid crystal display element are the same, good efficiency will be brought. When the luminous flux traveling toward the liquid crystal display element is shifted from a normal line of the display surface of the liquid crystal display element by θ, the reflected light will be relatively shifted by 2θ. It is recommended to reduce this θ as much as possible. This means that the length of the pupil of the projection lens is more prone to affect the brightness in the projector using the reflection liquid crystal display element than in the projector using the transmission liquid crystal display element.

Moreover, the color synthesis/color separation prism constituting the glass block P arranged on the rear side (original picture side) of the projection lens cannot transmit a quantity of light in a bright and wide range therethrough when a size of the prism is made small, and cannot sufficiently utilize the efficiency of the projection lens having a bright aperture. Moreover, particularly in the case of using a reflection liquid crystal display element, it is necessary to introduce the luminous flux subjected to the color separation into an optical path of the projection lens, and further to perform the color synthesis in the same space. Accordingly, it is necessary to provide a prism block with a thickness 2.5 times or more that of the effective image circle on the reduction side of the projection lens.

The conditional expression (6) is a condition necessary to capture the reflected light on the reflection liquid crystal display element with the projection lens more effectively. In the conditional expression (6), θ can be made constant according to the image height when the projection lens is an aplanatic lens. However, actually, the aberrations occur, and θ is varied by the image height, the zooming, and the like. When the projection lens departs from this expression, brightness of the image projected on the screen cannot be made sufficient.

Moreover, in general, the quantity of peripheral light becomes the minimum at the maximum image height y. Accordingly, when there is room in the quantity of light at the intermediate image height, the conditional expression (6) may not be satisfied at all the image heights. Moreover, also for this purpose, it is preferable to arrange the positive-refractive-power lens unit which does not move at the time of zooming on the most reduction side of the projection lens as described above.

Moreover, the conditional expression (7) is a condition for realizing a bright projection lens while maintaining an appropriate back focus. Unless the luminous flux can be captured into the projection lens at appropriate angles in the center of the optical axis and the periphery of the liquid crystal display element, a dark optical system will be brought. Specifically, on the center of the optical axis, the projection lens is irradiated with the luminous flux from the liquid crystal display element at an angle in accordance with the F number (F number =1/(2 sin ρ): the optical axis ±ρ is an angle extended by the axial luminous flux from the liquid crystal display element). Moreover, also in the peripheral portion, when the vignetting factor is large, the projection lens is irradiated with the luminous flux at an angle equivalent to that on the optical axis. Hence, when the projection optical lens departs from the range of the conditional expression (7), it becomes difficult to obtain a bright one as the projection lens.

In order to attain a bright optical system in this case, it is preferable that the F number be 3 or less.

Moreover, the diameter D of the lens, which is referred to in the conditional expression (7), indicates one larger than an effective diameter De of the lens concerned by approximately 3 to 5%.

The conditional expression (8) is a condition for setting the quantity of peripheral light sufficiently and appropriately. When the projection lens departs from the lower limit of the conditional expression (8), not only the quantity of peripheral light becomes short, but also it becomes difficult to elongate the length of the pupil to the periphery. Meanwhile, when the projection lens departs from the upper limit of the conditional expression (8), the lens system is upsized, which is not proper.

The conditional expression (9) is an expression necessary to appropriately maintain an interval of the back focus which the prism for use in the color separation and the color synthesis enters, and to appropriately set the power fk of the lens unit arranged on the above-mentioned most reduction side of the projection lens. When the projection lens departs from this expression, the variations of the pupil position at the time of zooming increase, and in addition, it becomes impossible to set the pupil far (to make the reduction side telecentric).

The conditional expression (10) is a condition for appropriately arranging the color separation/color synthesis prism with an effective size for the effective image circle. When a value of the conditional expression (10) exceeds the upper limit thereof, an appropriate back focus cannot be ensured. When the value is lower than the lower limit of the conditional expression (10), the lens system is upsized.

Lens data of Numerical Embodiments 4 to 13 corresponding to Embodiments 4 to 13 will be shown below. Moreover, Table 2 is a table showing results of calculating values of the above-mentioned respective conditional expressions for the respective Embodiments.

(Numerical Embodiment 4)
f = 28.70 to 34.48   fno = 1:2 to 2   2ω = 34.8° to 29.3

| | | | | | | | |
|---|---|---|---|---|---|---|---|
| r1 = | 79.288 | d1 = | 3.50 | n1 = | 1.83876 | ν1 = | 37.2 |
| r2 = | 505.657 | d2 = | 0.10 | | | | |
| r3 = | 54.897 | d3 = | 2.30 | n2 = | 1.60678 | ν2 = | 38.0 |
| r4 = | 34.189 | d4 = | 5.72 | | | | |
| r5 = | 270.019 | d5 = | 2.00 | n3 = | 1.60678 | ν3 = | 38.0 |
| r6 = | 43.527 | d6 = | Variable | | | | |
| r7 = | 55.486 | d7 = | 1.30 | n4 = | 1.76787 | ν4 = | 26.5 |
| r8 = | 41.852 | d8 = | 0.95 | | | | |
| r9 = | 200.344 | d9 = | 2.00 | n5 = | 1.81028 | ν5 = | 40.9 |
| r10 = | 143904.297 | d10 = | 0.20 | | | | |
| r11 = | 35.985 | d11 = | 2.50 | n6 = | 1.83876 | ν6 = | 37.2 |
| r12 = | 383.298 | d12 = | Variable | | | | |
| r13 = | −50.317 | d13 = | 1.30 | n7 = | 1.60524 | ν7 = | 60.6 |
| r14 = | 15.728 | d14 = | 2.50 | n8 = | 1.81185 | ν8 = | 25.4 |
| r15 = | 41.567 | d15 = | Variable | | | | |
| r16 = | 35.322 | d16 = | 1.00 | n9 = | 1.70384 | ν9 = | 30.1 |
| | (Stop) | | | | | | |
| r17 = | 23.548 | d17 = | 2.13 | | | | |
| r18 = | −43.974 | d18 = | 2.30 | n10 = | 1.69948 | ν10 = | 55.5 |
| r19 = | −26.547 | d19 = | 0.20 | | | | |
| r20 = | 50.585 | d20 = | 2.00 | n11 = | 1.66120 | ν11 = | 50.9 |

-continued

|   |   | r21 = | −213.646 | d21 = | 1.00 | n12 = | 1.85410 | v12 = | 23.9 |
|---|---|---|---|---|---|---|---|---|---|
|   |   | r22 = | 74.781 | d22 = | 5.48 |   |   |   |   |
|   |   | r23 = | −14.562 | d23 = | 1.40 | n13 = | 1.70384 | v13 = | 30.1 |
|   |   | r24 = | 106.916 | d24 = | 7.00 | n14 = | 1.48898 | v14 = | 70.2 |
|   |   | r25 = | −19.132 | d25 = | 0.15 |   |   |   |   |
|   |   | r26 = | 374.447 | d26 = | 6.00 | n15 = | 1.69948 | v15 = | 55.5 |
|   |   | r27 = | −30.622 | d27 = | 0.50 |   |   |   |   |
|   |   | r28 = | 46.892 | d28 = | 4.00 | n16 = | 1.60524 | v16 = | 60.6 |
|   |   | r29 = | ∞ | d29 = | 2.00 |   |   |   |   |
|   |   | r30 = | ∞ | d30 = | 26.00 | n17 = | 1.51805 | v17 = | 64.1 |
| P | { | r31 = | ∞ | d31 = | 23.30 | n18 = | 1.81185 | v18 = | 25.4 |
|   |   | r32 = | ∞ |   |   |   |   |   |   |

|   | Focal Length | | |
|---|---|---|---|
| Variable interval | 28.70 | 31.31 | 34.48 |
| d6 | 23.26 | 15.72 | 8.14 |
| d12 | 2.86 | 5.02 | 7.63 |
| d15 | 3.48 | 2.55 | 1.19 |

(Numerical Embodiment 5)
f = 28.70 to 34.48   fno = 1:1.6 to 1.6   2ω = 34.7° to 29.3°

|   |   | r1 = | 84.827 | d1 = | 3.50 | n1 = | 1.81028 | v1 = | 40.9 |
|---|---|---|---|---|---|---|---|---|---|
|   |   | r2 = | 535.920 | d2 = | 0.10 |   |   |   |   |
|   |   | r3 = | 56.281 | d3 = | 2.30 | n2 = | 1.51805 | v2 = | 64.1 |
|   |   | r4 = | 33.298 | d4 = | 4.74 |   |   |   |   |
|   |   | r5 = | 189.847 | d5 = | 2.00 | n3 = | 1.51805 | v3 = | 64.1 |
|   |   | r6 = | 46.931 | d6 = | Variable |   |   |   |   |
|   |   | r7 = | −59.236 | d7 = | 1.30 | n4 = | 1.70384 | v4 = | 30.1 |
|   |   | r8 = | 306.917 | d8 = | 0.12 |   |   |   |   |
|   |   | r9 = | 436.589 | d9 = | 2.50 | n5 = | 1.83897 | v5 = | 42.7 |
|   |   | r10 = | −77.033 | d10 = | 0.20 |   |   |   |   |
|   |   | r11 = | 70.197 | d11 = | 2.50 | n6 = | 1.78968 | v6 = | 44.2 |
|   |   | r12 = | −233.799 | d12 = | Variable |   |   |   |   |
|   |   | r13 = | −32.828 | d13 = | 1.30 | n7 = | 1.60524 | v7 = | 60.6 |
|   |   | r14 = | 17.707 | d14 = | 4.00 | n8 = | 1.81185 | v8 = | 25.4 |
|   |   | r15 = | 52.714 | d15 = | Variable |   |   |   |   |
|   |   | r16 = | 84.920 (Stop) | d16 = | 1.50 | n9 = | 1.70384 | v9 = | 30.1 |
|   |   | r17 = | 48.989 | d17 = | 1.37 |   |   |   |   |
|   |   | r18 = | −650.383 | d18 = | 3.00 | n10 = | 1.69948 | v10 = | 55.5 |
|   |   | r19 = | −30.728 | d19 = | 0.20 |   |   |   |   |
|   |   | r20 = | −131.797 | d20 = | 1.20 | n11 = | 1.65174 | v11 = | 33.8 |
|   |   | r21 = | 36.173 | d21 = | 3.00 | n12 = | 1.80768 | v12 = | 46.6 |
|   |   | r22 = | 1491.470 | d22 = | 5.39 |   |   |   |   |
|   |   | r23 = | −17.595 | d23 = | 1.40 | n13 = | 1.70384 | v13 = | 30.1 |
|   |   | r24 = | 65.520 | d24 = | 8.00 | n14 = | 1.48898 | v14 = | 70.2 |
|   |   | r25 = | −22.298 | d25 = | 0.15 |   |   |   |   |
|   |   | r26 = | 136.588 | d26 = | 6.00 | n15 = | 1.72305 | v15 = | 50.2 |
|   |   | r27 = | −41.622 | d27 = | 0.50 |   |   |   |   |
|   |   | r28 = | 53.522 | d28 = | 4.50 | n16 = | 1.60524 | v16 = | 60.6 |
|   |   | r29 = | ∞ | d29 = | 2.00 |   |   |   |   |
|   |   | r30 = | ∞ | d30 = | 26.00 | n17 = | 1.51805 | v17 = | 64.1 |
| P | { | r31 = | ∞ | d31 = | 23.30 | n18 = | 1.81185 | v18 = | 25.4 |
|   |   | r32 = | ∞ |   |   |   |   |   |   |

|   | Focal Length | | |
|---|---|---|---|
| Variable interval | 28.77 | 31.54 | 34.39 |
| d6 | 24.72 | 15.62 | 7.48 |
| d12 | 3.59 | 7.85 | 12.03 |
| d15 | 2.62 | 2.06 | 1.58 |

(Numerical Embodiment 6)
f = 28.78 to 34.42  fno = 1:1.6 to 1.6  2ω = 34.7° to 29.3°

|   | | | | | | |
|---|---|---|---|---|---|---|
| | r1 = | 83.188 | d1 = | 4.00 | n1 = 1.81028 | v1 = 40.9 |
| | r2 = | 549.175 | d2 = | 0.10 | | |
| | r3 = | 51.850 | d3 = | 2.30 | n2 = 1.51805 | v2 = 64.1 |
| | r4 = | 31.423 | d4 = | 5.10 | | |
| | r5 = | 138.983 | d5 = | 2.00 | n3 = 1.51805 | v3 = 64.1 |
| | r6 = | 41.999 | d6 = | Variable | | |
| | r7 = | −60.445 | d7 = | 1.30 | n4 = 1.70384 | v4 = 30.1 |
| | r8 = | 119.783 | d8 = | 0.03 | | |
| | r9 = | 116.599 | d9 = | 2.50 | n5 = 1.83897 | v5 = 42.7 |
| | r10 = | −86.363 | d10 = | 0.20 | | |
| | r11 = | 60.063 | d11 = | 2.50 | n6 = 1.78968 | v6 = 44.2 |
| | r12 = | −537.895 | d12 = | Variable | | |
| | r13 = | −35.458 | d13 = | 1.30 | n7 = 1.60524 | v7 = 60.6 |
| | r14 = | 18.555 | d14 = | 4.00 | n8 = 1.81185 | v8 = 25.4 |
| | r15 = | 51.158 | d15 = | Variable | | |
| | r16 = | 62.466 (Stop) | d16 = | 1.50 | n9 = 1.70384 | v9 = 30.1 |
| | r17 = | 42.227 | d17 = | 1.49 | | |
| | r18 = | −2271.505 | d18 = | 3.00 | n10 = 1.69948 | v10 = 55.5 |
| | r19 = | −33.642 | d19 = | 0.20 | | |
| | r20 = | 318.427 | d20 = | 1.20 | n11 = 1.65174 | v11 = 33.8 |
| | r21 = | 29.536 | d21 = | 3.00 | n12 = 1.80768 | v12 = 46.6 |
| | r22 = | 71.190 | d22 = | 6.97 | | |
| | r23 = | −17.657 | d23 = | 1.40 | n13 = 1.70384 | v13 = 30.1 |
| | r24 = | 65.392 | d24 = | 8.00 | n14 = 1.48898 | v14 = 70.2 |
| | r25 = | −22.885 | d25 = | 0.15 | | |
| | r26 = | 173.462 | d26 = | 6.00 | n15 = 1.72305 | v15 = 50.2 |
| | r27 = | −38.778 | d27 = | 0.50 | | |
| | r28 = | 45.697 | d28 = | 4.50 | n16 = 1.60524 | v16 = 60.6 |
| | r29 = | ∞ | d29 = | 2.00 | | |
| | r30 = | ∞ | d30 = | 26.00 | n17 = 1.51805 | v17 = 64.1 |
| P | r31 = | ∞ | d31 = | 23.30 | n18 = 1.81185 | v18 = 25.4 |
| | r32 = | ∞ | | | | |

| | Focal Length | | |
|---|---|---|---|
| Variable interval | 28.78 | 31.54 | 34.42 |
| d6 | 23.58 | 15.45 | 8.07 |
| d12 | 3.00 | 6.98 | 10.90 |
| d15 | 3.15 | 2.24 | 1.38 |

(Numerical Embodiment 7)
f = 28.70 to 34.48  fno = 1:2.0 to 2.0  2ω = 34.8° to 29.3°

| | | | | | |
|---|---|---|---|---|---|
| r1 = | 109.403 | d1 = | 4.00 | n1 = 1.81028 | v1 = 40.9 |
| r2 = | 1957.567 | d2 = | 0.10 | | |
| r3 = | 66.686 | d3 = | 2.30 | n2 = 1.51805 | v2 = 64.1 |
| r4 = | 38.539 | d4 = | 4.26 | | |
| r5 = | 175.433 | d5 = | 2.00 | n3 = 1.51805 | v3 = 64.1 |
| r6 = | 48.864 | d6 = | Variable | | |
| r7 = | −60.467 | d7 = | 1.30 | n4 = 1.70384 | v4 = 30.1 |
| r8 = | 72.597 | d8 = | 0.11 | | |
| r9 = | 78.956 | d9 = | 3.00 | n5 = 1.83897 | v5 = 42.7 |
| r10 = | −70.463 | d10 = | 0.20 | | |
| r11 = | 76.348 | d11 = | 2.50 | n6 = 1.78968 | v6 = 44.2 |
| r12 = | −795.795 | d12 = | Variable | | |
| r13 = | −30.825 | d13 = | 1.30 | n7 = 1.60524 | v7 = 60.6 |
| r14 = | 17.965 | d14 = | 3.50 | n8 = 1.81185 | v8 = 25.4 |
| r15 = | 70.954 | d15 = | Variable | | |
| r16 = | 43.652 (Stop) | d16 = | 1.50 | n9 = 1.70384 | v9 = 30.1 |
| r17 = | 37.953 | d17 = | 2.06 | | |
| r18 = | 124.147 | d18 = | 3.00 | n10 = 1.69948 | v10 = 55.5 |
| r19 = | −37.166 | d19 = | 0.20 | | |
| r20 = | 378.251 | d20 = | 1.20 | n11 = 1.65174 | v11 = 33.8 |
| r21 = | 23.611 | d21 = | 2.60 | n12 = 1.80768 | v12 = 46.6 |
| r22 = | 42.828 | d22 = | 6.22 | | |
| r23 = | −16.031 | d23 = | 1.40 | n13 = 1.70384 | v13 = 30.1 |
| r24 = | 65.110 | d24 = | 7.00 | n14 = 1.48898 | v14 = 70.2 |
| r25 = | −20.625 | d25 = | 0.15 | | |

-continued

|   | r26 = | 269.055 | d26 = | 4.50 | n15 = | 1.72305 | v15 = | 50.2 |
|---|---|---|---|---|---|---|---|---|
|   | r27 = | −38.925 | d27 = | 0.50 |   |   |   |   |
|   | r28 = | 40.502 | d28 = | 4.50 | n16 = | 1.60524 | v16 = | 60.6 |
|   | r29 = | ∞ | d29 = | 2.00 |   |   |   |   |
|   | r30 = | ∞ | d30 = | 26.00 | n17 = | 1.51805 | v17 = | 64.1 |
| P | r31 = | ∞ | d31 = | 23.30 | n18 = | 1.81185 | v18 = | 25.4 |
|   | r32 = | ∞ |   |   |   |   |   |   |

| | Focal Length | | |
|---|---|---|---|
| Variable interval | 28.70 | 31.56 | 34.48 |
| d6 | 31.85 | 21.17 | 12.03 |
| d12 | 2.68 | 7.16 | 11.64 |
| d15 | 1.86 | 1.43 | 0.99 |

(Numerical Embodiment 8)
f = 28.78 to 34.48   fno = 1:2.0 to 2.0   2ω = 34.8° to 29.3°

|   | r1 = | 175.392 | d1 = | 4.00 | n1 = | 1.81185 | v1 = | 25.4 |
|---|---|---|---|---|---|---|---|---|
|   | r2 = | 1216.091 | d2 = | 0.10 |   |   |   |   |
|   | r3 = | 103.026 | d3 = | 3.00 | n2 = | 1.48898 | v2 = | 70.2 |
|   | r4 = | 37.616 | d4 = | 6.82 |   |   |   |   |
|   | r5 = | 149.173 | d5 = | 3.00 | n3 = | 1.48898 | v3 = | 70.2 |
|   | r6 = | 44.139 | d6 = | Variable |   |   |   |   |
|   | r7 = | 97.030 | d7 = | 2.00 | n4 = | 1.78968 | v4 = | 44.2 |
|   | r8 = | 46.636 | d8 = | 41.36 |   |   |   |   |
|   | r9 = | 182.431 | d9 = | 2.00 | n5 = | 1.81028 | v5 = | 40.9 |
|   | r10 = | −168.869 | d10 = | 0.20 |   |   |   |   |
|   | r11 = | 57.339 | d11 = | 2.50 | n6 = | 1.70384 | v6 = | 30.1 |
|   | r12 = | .234 | d12 = | Variable |   |   |   |   |
|   | r13 = | −315.053 | d13 = | 2.00 | n7 = | 1.70384 | v7 = | 30.1 |
|   | r14 = | −60.802 | d14 = | 1.50 | n8 = | 1.78968 | v8 = | 44.2 |
|   | r15 = | 17.288 | d15 = | Variable |   |   |   |   |
|   | r16 = | 51.211 (Stop) | d16 = | 2.50 | n9 = | 1.81028 | v9 = | 40.9 |
|   | r17 = | −518.420 | d17 = | 17.98 |   |   |   |   |
|   | r18 = | −198.766 | d18 = | 4.37 | n10 = | 1.78968 | v10 = | 44.2 |
|   | r19 = | −26.525 | d19 = | 0.15 |   |   |   |   |
|   | r20 = | −123.791 | d20 = | 5.00 | n11 = | 1.72305 | v11 = | 50.2 |
|   | r21 = | −21.176 | d21 = | 2.00 | n12 = | 1.81028 | v12 = | 40.9 |
|   | r22 = | 127.513 | d22 = | 2.58 |   |   |   |   |
|   | r23 = | −133.068 | d23 = | 1.40 | n13 = | 1.70384 | v13 = | 30.1 |
|   | r24 = | 33.241 | d24 = | 8.00 | n14 = | 1.48898 | v14 = | 70.2 |
|   | r25 = | −42.005 | d25 = | 0.15 |   |   |   |   |
|   | r26 = | 257.124 | d26 = | 3.00 | n15 = | 1.72305 | v15 = | 50.2 |
|   | r27 = | −6394.503 | d27 = | 0.50 |   |   |   |   |
|   | r28 = | 65.985 | d28 = | 5.00 | n16 = | 1.72305 | v16 = | 50.2 |
|   | r29 = | −118.482 | d29 = | 2.00 |   |   |   |   |
|   | r30 = | ∞ | d30 = | 40.00 | n17 = | 1.74753 | v17 = | 44.8 |
| P | r31 = | ∞ | d31 = | 25.00 | n18 = | 1.74753 | v18 = | 44.8 |
|   | r32 = | ∞ |   |   |   |   |   |   |

| | Focal Length | | |
|---|---|---|---|
| Variable interval | 15.21 | 16.6 | 18.00 |
| d6 | 21.69 | 12.76 | 5.19 |
| d12 | 1.29 | 2.83 | 4.37 |
| d15 | 4.89 | 4.88 | 4.86 |

(Numerical Embodiment 9)
f = 15.11 to 17.98   fno = 1:1.98 to 2.0   2ω = 58.1° to 50.1°

| r1 = | 116.411 | d1 = | 4.00 | n1 = | 1.81185 | v1 = | 25.4 |
|---|---|---|---|---|---|---|---|
| r2 = | 366.288 | d2 = | 0.10 |   |   |   |   |
| r3 = | 64.428 | d3 = | 2.50 | n2 = | 1.48898 | v2 = | 70.2 |
| r4 = | 29.571 | d4 = | 8.43 |   |   |   |   |
| r5 = | 130.438 | d5 = | 2.50 | n3 = | 1.48898 | v3 = | 70.2 |

-continued

| r6 = | 36.973 | d6 = | Variable |   |   |   |   |
|---|---|---|---|---|---|---|---|
| r7 = | 76.885 | d7 = | 2.00 | n4 = | 1.77582 | v4 = | 49.6 |
| r8 = | 36.028 | d8 = | 31.21 |   |   |   |   |
| r9 = | 344.550 | d9 = | 1.50 | n5 = | 1.81028 | v5 = | 40.9 |
| r10 = | 177.414 | d10 = | 2.45 |   |   |   |   |
| r11 = | 46.425 | d11 = | 2.50 | n6 = | 1.70384 | v6 = | 30.1 |
| r12 = | −119.520 | d12 = | Variable |   |   |   |   |
| r13 = | 260.329 | d13 = | 1.50 | n7 = | 1.78968 | v7 = | 44.2 |

-continued

| | | | | | | | |
|---|---|---|---|---|---|---|---|
| r14 = | 18.197 | d14 = | Variable | | | | |
| r15 = | 48.254 | d15 = | 2.50 | n8 = | 1.81028 | v8 = | 40.9 |
| | (Stop) | | | | | | |
| r16 = | −362.887 | d16 = | 17.68 | | | | |
| r17 = | −217.908 | d17 = | 5.27 | n9 = | 1.78968 | v9 = | 44.2 |
| r18 = | −26.494 | d18 = | 0.15 | | | | |
| r19 = | −62.969 | d19 = | 4.50 | n10 = | 1.72305 | v10 = | 50.2 |
| r20 = | −20.305 | d20 = | 1.50 | n11 = | 1.81028 | v11 = | 40.9 |
| r21 = | 144.925 | d21 = | Variable | | | | |
| r22 = | −459.740 | d22 = | 1.40 | n12 = | 1.70384 | v12 = | 30.1 |
| r23 = | 35.027 | d23 = | 7.00 | n13 = | 1.48898 | v13 = | 70.2 |
| r24 = | −45.952 | d24 = | 0.15 | | | | |
| r25 = | 569.940 | d25 = | 2.50 | n14 = | 1.72305 | v14 = | 50.2 |
| r26 = | −253.241 | d26 = | Variable | | | | |
| r27 = | 69.101 | d27 = | 4.00 | n15 = | 1.69948 | v15 = | 55.5 |
| r28 = | −106.247 | d28 = | 2.00 | | | | |
| r29 = | ∞ | d29 = | 40.00 | n16 = | 1.74753 | v16 = | 44.8 |
| r30 = | ∞ | d30 = | 25.00 | n17 = | 1.74753 | v17 = | 44.8 |
| r31 = | ∞ | | | | | | |

| | Focal Length | | |
|---|---|---|---|
| Variable interval | 15.11 | 16.48 | 17.98 |
| d6 | 19.70 | 12.30 | 4.89 |
| d12 | 2.79 | 5.11 | 7.38 |
| d14 | 4.28 | 4.28 | 4.33 |
| d21 | 2.10 | 2.96 | 3.83 |
| d26 | 0.50 | 4.72 | 8.93 |

(Numerical Embodiment 10)
f = 15.09 to 17.97   fno = 1:1.97 to 2.0   2ω = 58.2° to 50.1°

| | | | | | | | |
|---|---|---|---|---|---|---|---|
| r1 = | 118.138 | d1 = | 4.00 | n1 = | 1.81185 | v1 = | 25.4 |
| r2 = | 379.689 | d2 = | 0.10 | | | | |
| r3 = | 63.562 | d3 = | 2.50 | n2 = | 1.48898 | v2 = | 70.2 |
| r4 = | 29.666 | d4 = | 7.82 | | | | |

-continued

| | | | | | | | |
|---|---|---|---|---|---|---|---|
| r5 = | 120.033 | d5 = | 2.50 | n3 = | 1.48898 | v3 = | 70.2 |
| r6 = | 34.869 | d6 = | Variable | | | | |
| r7 = | 89.046 | d7 = | 2.00 | n4 = | 1.77582 | v4 = | 49.6 |
| r8 = | 43.255 | d8 = | 32.17 | | | | |
| r9 = | 559.238 | d9 = | 1.50 | n5 = | 1.81028 | v5 = | 40.9 |
| r10 = | 1216.286 | d10 = | 3.23 | | | | |
| r11 = | 41.462 | d11 = | 2.50 | n6 = | 1.70384 | v6 = | 30.1 |
| r12 = | −271.281 | d12 = | Variable | | | | |
| r13 = | 173.792 | d13 = | 1.50 | n7 = | 1.78968 | v7 = | 44.2 |
| r14 = | 17.073 | d14 = | 4.28 | | | | |
| r15 = | 58.915 | d15 = | 2.50 | n8 = | 1.81028 | v8 = | 40.9 |
| | (Stop) | | | | | | |
| r16 = | −423.087 | d16 = | 18.58 | | | | |
| r17 = | −126.426 | d17 = | 4.47 | n9 = | 1.78968 | v9 = | 44.2 |
| r18 = | −25.063 | d18 = | 0.15 | | | | |
| r19 = | −67.485 | d19 = | 4.50 | n10 = | 1.72305 | v10 = | 50.2 |
| r20 = | −20.662 | d20 = | 1.50 | n11 = | 1.81028 | v11 = | 40.9 |
| r21 = | 179.796 | d21 = | Variable | | | | |
| r22 = | −1206.535 | d22 = | 1.40 | n12 = | 1.70384 | v12 = | 30.1 |
| r23 = | 35.493 | d23 = | 6.50 | n13 = | 1.48898 | v13 = | 70.2 |
| r24 = | −47.582 | d24 = | 0.15 | | | | |
| r25 = | 1122.511 | d25 = | 2.50 | n14 = | 1.72305 | v14 = | 50.2 |
| r26 = | −270.824 | d26 = | Variable | | | | |
| r27 = | 60.033 | d27 = | 4.00 | n15 = | 1.69948 | v15 = | 55.5 |
| r28 = | −124.095 | d28 = | 2.00 | | | | |
| r29 = | ∞ | d29 = | 40.00 | n16 = | 1.74753 | v16 = | 44.8 |
| r30 = | ∞ | d30 = | 25.00 | n17 = | 1.74753 | v17 = | 44.8 |
| r31 = | ∞ | | | | | | |

| | Focal Length | | |
|---|---|---|---|
| Variable interval | 15.09 | 16.32 | 17.97 |
| d6 | 19.23 | 12.44 | 5.64 |
| d12 | 2.79 | 4.60 | 7.64 |
| d21 | 1.93 | 3.06 | 2.96 |
| d26 | 0.50 | 4.35 | 8.21 |

(Numerical Embodiment 11)
f = 15.10 to 17.97   fno = 1:1.94 to 2.0   2ω = 58.2° to 50.1°

| | | | | | | | |
|---|---|---|---|---|---|---|---|
| r1 = | 132.386 | d1 = | 4.00 | n1 = | 1.81185 | v1 = | 25.4 |
| r2 = | 518.208 | d2 = | 0.10 | | | | |
| r3 = | 65.996 | d3 = | 2.50 | n2 = | 1.48898 | v2 = | 70.2 |
| r4 = | 29.289 | d4 = | 8.11 | | | | |
| r5 = | 146.039 | d5 = | 2.50 | n3 = | 1.48898 | v3 = | 70.2 |
| r6 = | 34.481 | d6 = | Variable | | | | |
| r7 = | 64.915 | d7 = | 2.00 | n4 = | 1.77582 | v4 = | 49.6 |
| r8 = | 41.536 | d8 = | 33.85 | | | | |
| r9 = | 429.600 | d9 = | 2.00 | n5 = | 1.81028 | v5 = | 40.9 |
| r10 = | 2111.950 | d10 = | 2.27 | | | | |
| r11 = | 41.435 | d11 = | 2.50 | n6 = | 1.70384 | v6 = | 30.1 |
| r12 = | −426.038 | d12 = | Variable | | | | |
| r13 = | 85.899 | d13 = | 1.50 | n7 = | 1.78968 | v7 = | 44.2 |
| r14 = | 16.130 | d14 = | 4.28 | | | | |
| r15 = | 69.615 | d15 = | 2.50 | n8 = | 1.81028 | v8 = | 40.9 |
| | (Stop) | | | | | | |
| r16 = | −826.347 | d16 = | 18.68 | | | | |
| r17 = | −145.035 | d17 = | 4.59 | n9 = | 1.78968 | v9 = | 44.2 |
| r18 = | −25.005 | d18 = | 0.15 | | | | |
| r19 = | −69.546 | d19 = | 4.50 | n10 = | 1.72305 | v10 = | 50.2 |
| r20 = | −21.058 | d20 = | 1.50 | n11 = | 1.81028 | v11 = | 40.9 |
| r21 = | 142.425 | d21 = | Variable | | | | |
| r22 = | 272.798 | d22 = | 1.40 | n12 = | 1.70384 | v12 = | 30.1 |
| r23 = | 34.236 | d23 = | 6.50 | n13 = | 1.48898 | v13 = | 70.2 |
| r24 = | −40.394 | d24 = | Variable | | | | |
| r25 = | 54.596 | d25 = | 4.00 | n14 = | 1.69948 | v14 = | 55.5 |
| r26 = | −195.203 | d26 = | 2.00 | | | | |
| r27 = | ∞ | d27 = | 40.00 | n15 = | 1.74753 | v15 = | 44.8 |
| r28 = | ∞ | d28 = | 25.00 | n16 = | 1.74753 | v16 = | 44.8 |

-continued

| | |
|---|---|
| r29 = | ∞ |

| | Focal Length | | |
|---|---|---|---|
| Variable interval | 15.10 | 16.29 | 17.97 |
| d6 | 20.24 | 14.03 | 7.83 |
| d12 | 2.80 | 4.19 | 7.00 |
| d21 | 1.84 | 2.47 | 1.69 |
| d26 | 0.50 | 4.68 | 8.86 |

(Numerical Embodiment 12)
f = 15.11 to 17.97   fno = 1:1.95 to 2.0   2ω = 58.1° to 50.1°

| | | | | | | | |
|---|---|---|---|---|---|---|---|
| | r1 = | 147.162 | d1 = | 4.00 | n1 = | 1.81185 v1 = | 25.4 |
| | r2 = | 628.240 | d2 = | 0.10 | | | |
| | r3 = | 75.405 | d3 = | 2.50 | n2 = | 1.48898 v2 = | 70.2 |
| | r4 = | 30.076 | d4 = | 7.07 | | | |
| | r5 = | 127.881 | d5 = | 2.50 | n3 = | 1.48898 v3 = | 70.2 |
| | r6 = | 37.514 | d6 = | Variable | | | |
| | r7 = | 91.075 | d7 = | 2.00 | n4 = | 1.77582 v4 = | 49.6 |
| | r8 = | 42.131 | d8 = | 30.90 | | | |
| | r9 = | 726.724 | d9 = | 2.50 | n5 = | 1.81028 v5 = | 40.9 |
| | r10 = | −837.170 | d10 = | 11.14 | | | |
| | r11 = | 51.105 | d11 = | 2.50 | n6 = | 1.70384 v6 = | 30.1 |
| | r12 = | −166.299 | d12 = | Variable | | | |
| | r13 = | 82.296 | d13 = | 1.50 | n7 = | 1.78968 v7 = | 44.2 |
| | r14 = | 17.670 | d14 = | 4.28 | | | |
| | r15 = | 54.339 (Stop) | d15 = | 2.50 | n8 = | 1.81028 v8 = | 40.9 |
| | r16 = | 1381.022 | d16 = | 20.06 | | | |
| | r17 = | −1313.376 | d17 = | 4.54 | n9 = | 1.78968 v9 = | 44.2 |
| | r18 = | −29.086 | d18 = | 0.15 | | | |
| | r19 = | −67.760 | d19 = | 1.50 | n10 = | 1.81028 v10 = | 40.9 |
| | r20 = | 26.243 | d20 = | 4.60 | n11 = | 1.72305 v11 = | 50.2 |
| | r21 = | 141.343 | d21 = | Variable | | | |
| | r22 = | −232.677 | d22 = | 1.40 | n12 = | 1.70384 v12 = | 30.1 |
| | r23 = | 36.413 | d23 = | 6.50 | n13 = | 1.48898 v13 = | 70.2 |
| | r24 = | −35.531 | d24 = | Variable | | | |
| | r25 = | 54.290 | d25 = | 4.00 | n14 = | 1.72305 v14 = | 50.2 |
| | r26 = | −208.648 | d26 = | 2.00 | | | |
| | r27 = | ∞ | d27 = | 40.00 | n15 = | 1.74753 v15 = | 44.8 |
| P | r28 = | ∞ | d28 = | 25.00 | n16 = | 1.74753 v16 = | 44.8 |
| | r29 = | ∞ | | | | | |

| | Focal length | | |
|---|---|---|---|
| Variable interval | 15.11 | 16.40 | 17.97 |
| d6 | 18.15 | 11.65 | 5.14 |
| d12 | 2.80 | 4.61 | 7.12 |
| d21 | 2.37 | 3.01 | 2.94 |
| d24 | 0.50 | 4.56 | 8.62 |

(Numerical Embodiment 13)
f = 15.33 to 18.18   fno = 1:2 to 2.22   2ω = 58.0° to 50.1°

| | | | | | |
|---|---|---|---|---|---|
| r1 = | 184.132 | d1 = | 4.00 | n1 = | 1.69948 v1 = 55.5 |
| r2 = | −872.355 | d2 = | 0.15 | | |
| r3 = | 84.775 | d3 = | 1.80 | n2 = | 1.62528 v2 = 58.2 |
| r4 = | 23.975 | d4 = | 7.17 | | |
| r5 = | −211.644 | d5 = | 1.60 | n3 = | 1.62528 v3 = 58.2 |
| r6 = | 48.306 | d6 = | 5.60 | | |
| r7 = | −61.699 | d7 = | 1.60 | n4 = | 1.62528 v4 = 58.2 |
| r8 = | 101.726 | d8 = | 3.20 | | |
| r9 = | −385.395 | d9 = | 6.00 | n5 = | 1.83876 v5 = 37.2 |
| r10 = | −46.991 | d10 = | Variable | | |
| r11 = | 45.539 | d11 = | 5.00 | n6 = | 1.60678 v6 = 38.0 |
| r12 = | −127.159 | d12 = | 14.89 | | |
| r13 = | 33.093 | d13 = | 1.40 | n7 = | 1.69948 v7 = 55.5 |

-continued

|   | r14 = | 15.846 | d14 = | 18.65 |  |  |  |  |
|---|---|---|---|---|---|---|---|---|
|   | r15 = | −55.612 | d15 = | 3.00 | n8 = | 1.65174 | v8 = | 33.8 |
|   | r16 = | −37.978 | d16 = | 3.60 |  |  |  |  |
|   | r17 = | 0.000 (Stop) | d17 = | 0.00 |  |  |  |  |
|   | r18 = | 302.145 | d18 = | 3.50 | n9 = | 1.66120 | v9 = | 50.9 |
|   | r19 = | −27.672 | d19 = | Variable |  |  |  |  |
|   | r20 = | −25.714 | d20 = | 0.85 | n10 = | 1.83876 | v10 = | 37.2 |
|   | r21 = | 58.863 | d21 = | 5.50 | n11 = | 1.51805 | v11 = | 64.1 |
|   | r22 = | −20.616 | d22 = | Variable |  |  |  |  |
|   | r23 = | −27.086 | d23 = | 1.40 | n12 = | 1.83876 | v12 = | 37.2 |
|   | r24 = | 40.770 | d24 = | 0.15 |  |  |  |  |
|   | r25 = | 34.874 | d25 = | 4.00 | n13 = | 1.81185 | v13 = | 25.4 |
|   | r26 = | −63.730 | d26 = | Variable |  |  |  |  |
|   | r27 = | −592.565 | d27 = | 2.00 | n14 = | 1.81185 | v14 = | 25.4 |
|   | r28 = | 29.177 | d28 = | 0.27 |  |  |  |  |
|   | r29 = | 31.438 | d29 = | 14.07 | n15 = | 1.60524 | v15 = | 60.6 |
|   | r30 = | −18.442 | d30 = | 1.40 | n16 = | 1.81185 | v16 = | 25.4 |
|   | r31 = | −34.490 | d31 = | Variable |  |  |  |  |
|   | r32 = | 157.034 | d32 = | 5.71 | n17 = | 1.85415 | v17 = | 23.8 |
|   | r33 = | −57.974 | d33 = | 1.00 |  |  |  |  |
|   | r34 = | ∞ | d34 = | 60.00 | n18 = | 1.74753 | v18 = | 44.8 |
| P | r35 = | ∞ | d35 = | 6.00 | n19 = | 1.51805 | v19 = | 64.1 |
|   | r36 = | ∞ |  |  |  |  |  |  |

|  | Focal Length | | |
|---|---|---|---|
| Variable interval | 15.33 | 16.67 | 18.18 |
| d10 | 15.68 | 9.77 | 3.86 |
| d19 | 1.96 | 2.40 | 3.17 |
| d22 | 1.59 | 6.58 | 11.25 |
| d26 | 4.39 | 4.66 | 4.92 |
| d31 | 1.00 | 1.20 | 1.41 |

TABLE 2

|  | Example | | | | | | | | | |
|---|---|---|---|---|---|---|---|---|---|---|
|  | 4 | 5 | 6 | 7 | 8 | 9 | 10 | 11 | 12 | 13 |
| Unit configuration | Negative/ Positive/ Negative/ Positive | Negative/ Positive/ Negative/ Positive | Negative/ Positive/ Negative/ Positive | Negative/ Positive/ Negative/ Positive | Negative/ Positive/ Negative/ Positive | Negative/ Positive/ Negative/ Positive/ Positive | Negative/ Positive/ Negative/ Positive/ Positive | Negative/ Positive/ Negative/ Positive | Negative/ Positive/ Negative/ Positive | Negative/ Positive/ Negative/ Positive |
| Fno | 2 | 1.6 | 1.6 | 2 | 2 | 1.97 to 2 | 1.97 to 2 | 1.95 to 2 | 1.95 to 2 | 2 to 2.22 |
| Thickness of prism block d | 49.3 | 49.3 | 49.3 | 49.3 | 65 | 65 | 65 | 65 | 65 | 66 |
| Circle $\phi$ | 18 | 18 | 18 | 18 | 16.8 | 16.8 | 16.8 | 16.8 | 16.8 | 17 |
| tk | −192.3 | −161.4 | −263.6 | −166.18 | −1007.7 | −676.64 | −1289.03 | −560.8 | −524.2 | −353.7 |
| θy (at maximum image height y)° | 0.723 | −0.13 | 0.076 | 0.143 | −0.277 | −0.315 | −0.605 | 0.376 | 0.39 | −0.015 |
| Effective diameter of final lens De | 29.4 | 32.8 | 32.4 | 29.6 | 29.6 | 29.2 | 29.8 | 28.8 | 28.7 | 31.1 |
| D = 1.05De (Effective diameter +5%) | 30.87 | 34.44 | 34.02 | 31.08 | 31.08 | 30.66 | 31.29 | 30.24 | 30.135 | 32.655 |
| bf | 38.99 | 39.3 | 38.98 | 33.99 | 46.17 | 46.17 | 46.18 | 46.18 | 46.18 | 49.28 |
| fk | 29.61 | 29.66 | 30.19 | 31.17 | 35.68 | 60.43 | 58.36 | 61.4 | 59.96 | 50.19 |
| d/$\phi$ | 2.739 | 2.739 | 2.739 | 2.739 | 3.869 | 3.869 | 3.869 | 3.869 | 3.869 | 3.882 |
| $\phi$/tk | −0.094 | −0.112 | −0.068 | −0.108 | −0.017 | −0.025 | −0.013 | −0.030 | −0.032 | −0.048 |
| De/bf | 0.754 | 0.835 | 0.831 | 0.871 | 0.641 | 0.632 | 0.645 | 0.624 | 0.621 | 0.631 |
| D/bf | 0.792 | 0.876 | 0.873 | 0.914 | 0.673 | 0.664 | 0.678 | 0.655 | 0.653 | 0.663 |
| De/$\phi$ | 1.633 | 1.822 | 1.800 | 1.644 | 1.762 | 1.738 | 1.774 | 1.714 | 1.708 | 1.829 |
| D/$\phi$ | 1.715 | 1.913 | 1.890 | 1.727 | 1.850 | 1.825 | 1.863 | 1.800 | 1.794 | 1.921 |
| bk/fk | 1.317 | 1.325 | 1.291 | 1.090 | 1.294 | 0.764 | 0.791 | 0.752 | 0.770 | 0.982 |
| $\phi$/bf | 0.462 | 0.458 | 0.462 | 0.530 | 0.364 | 0.364 | 0.364 | 0.364 | 0.364 | 0.345 |

Figure 27:
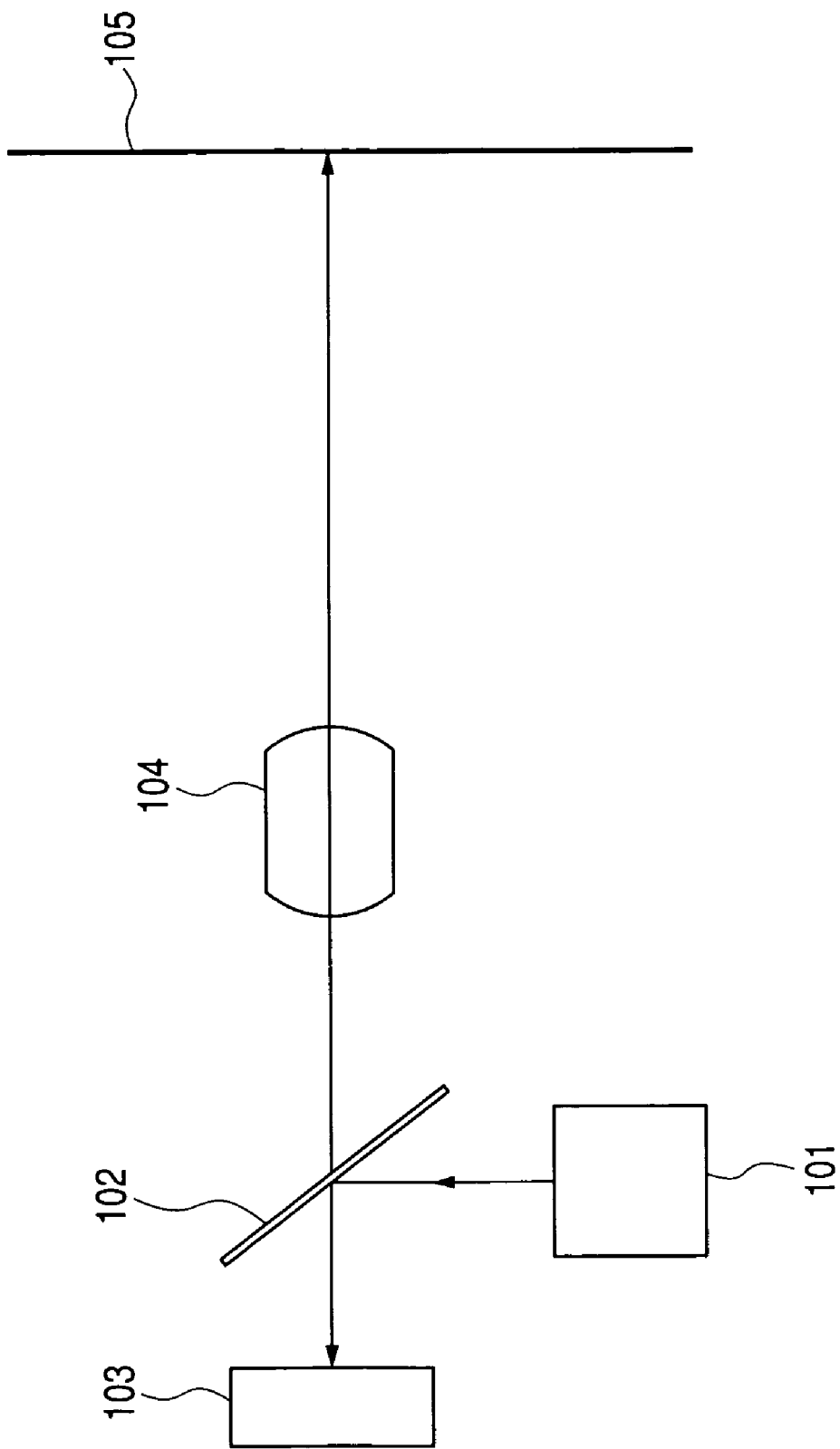
FIG. 27 is a schematic view of main portions when the image projection apparatus is applied to a reflection liquid crystal projector.

FIG. 27 is a schematic diagram of main portions of an embodiment in which the variable-power optical system or the projection optical system of the present invention is applied to the projector (image projection apparatus) using the reflection liquid crystal display element.

A luminous flux from an illumination optical system 101 is reflected by a beam splitter 102, enters a reflection liquid crystal display panel 103, and is then reflected thereby. Thereafter, the luminous flux subjected to light modulation in the liquid crystal display panel 103 passes through the beam splitter 102, and is incident onto a projection optical system 104 composed of the zoom lens described in Embodiments 1 to 3 or the projection lens described in Embodiments 4 to 13. Then, the luminous flux of image information based on the liquid crystal display panel 103 is projected on a screen 105 by means of the projection optical system 104.

This application claims priority from Japanese Patent Application Nos. 2003-207160 filed on Aug. 11, 2003 and 2003-337564 filed on Sep. 29, 2003, which is hereby incorporated by reference herein.

What is claimed is:

1. A variable-power optical system, comprising, sequentially from a front side to a rear side:
   a negative-optical-power first lens unit;
   a positive-optical-power second lens unit;
   a negative-optical-power third lens unit;
   a fourth lens unit;
   a negative-optical-power fifth lens unit; and
   a positive-optical-power sixth lens unit,
   wherein:
      intervals between the respective lens units are changed at a time of zooming, and the first lens unit and the sixth lens unit do not move for zooming; and
      the following conditional expression is satisfied:

$$1.7 < bf/(|f1| \cdot fw)^{1/2} < 2.3$$

where f1 represents a focal length of the first lens unit, bf represents a back focus in air, and fw represents a focal length of an overall system at a short focal-length end.

2. A variable-power optical system according to claim 1, wherein the first lens unit comprises, sequentially from the front side to the rear side, a biconvex positive lens element, a negative meniscus lens element facing a convex surface toward the front, two negative lens elements, and a positive meniscus lens element facing a convex surface rearward.

3. A variable-power optical system according to claim 1, wherein the following conditional expression is satisfied:

$$0.5 < |f1|/f2 < 0.90$$

where f1 represents a focal length of the first lens unit, and f2 represents a focal length of the second lens unit.

4. A variable-power optical system according to claim 1, wherein the following conditional expression is satisfied:

$$10 < |f4|/fw < 40$$

where fw represents the focal length of the overall system at the short focal-length end, and f4 represents a focal length of the fourth lens unit.

5. A variable-power optical system according to claim 1, wherein the sixth lens unit includes one or more positive lens elements, and the following conditional expression is satisfied:

$$v6p < 30$$

where v6p represents a smallest Abbe number among Abbe numbers of materials constituting the one or more positive lens elements.

6. A variable-power optical system according to claim 1, wherein the fifth lens unit is comprises, sequentially from the front side to the rear side, a negative lens element, a biconvex positive lens element, and a meniscus lens element facing a convex surface rearward.

7. A projection optical system for enlarging an original image and projecting the enlarged original image on a projection surface, comprising:
   a plurality of lens units with intervals of the plurality of lens units being changed at a time of zooming,
   wherein a back focus in air of the projection optical system is 2.5 times or more a diameter of an effective image circle at an original image position, and the following conditional expression is satisfied:

$$|\phi/tk| < 0.12$$

where $\phi$ represents the diameter of the effective image circle, and tk represents a distance at a short focal-length end from the original image position to a paraxial pupil position viewed from the original image side.

8. A projection optical system according to claim 7, wherein, among the plurality of lens units, a lens unit arranged at a position closest to the projection surface has negative optical power, and a lens unit arranged at a position closest to the original image has positive optical power, and the lens unit arranged at the position closest to the original image does not move at the time of zooming.

9. A projection optical system according to claim 7, wherein the following conditional expression is satisfied:

$$|\theta| < 0.8°$$

where $\theta$ represents an angle between a principal ray of a maximum image height at the original image position and a surface normal line at the original image position.

10. A projection optical system according to claim 7, wherein the following conditional expression is satisfied:

$$0.6 < D/bf < 0.92$$

where D represents a diameter of a lens element arranged at a position closest to the original image, and bf represents the back focus in air of the projection optical system.

11. A projection optical system according to claim 7, wherein the following conditional expression is satisfied:

$$1.5 < D/\phi < 2.5$$

where D represents a diameter of a lens element arranged at a position closest to the original image.

12. An image projection apparatus, comprising:
    an image display element for displaying an original image; and
    the variable-power optical system according to claim 1, the variable-power optical system projecting the original image on a projection surface.

13. An image projection apparatus, comprising:
    an image display element for displaying an original image; and
    the projection optical system according to claim 7, the projection optical system projecting the original image on a projection surface.

* * * * *